United States Patent
Iso-Sipila et al.

(10) Patent No.: US 12,511,483 B2
(45) Date of Patent: Dec. 30, 2025

(54) NAME ENTITY RECOGNITION WITH DEEP LEARNING

(71) Applicant: BENEVOLENTAI TECHNOLOGY LIMITED, London (GB)

(72) Inventors: Juha Iso-Sipila, London (GB); Felix Alexander Kruger, London (GB); Amir Safari, London (GB); Theodosia Togia, London (GB)

(73) Assignee: BENEVOLENTAI TECHNOLOGY LIMITED, London (GB)

( * ) Notice: Subject to any disclaimer, the term of this patent is extended or adjusted under 35 U.S.C. 154(b) by 635 days.

(21) Appl. No.: 17/437,982

(22) PCT Filed: Mar. 23, 2020

(86) PCT No.: PCT/GB2020/050779
§ 371 (c)(1),
(2) Date: Sep. 10, 2021

(87) PCT Pub. No.: WO2020/193966
PCT Pub. Date: Oct. 1, 2020

(65) Prior Publication Data
US 2022/0188520 A1    Jun. 16, 2022

(30) Foreign Application Priority Data
Mar. 26, 2019 (GB) .................................. 1904167

(51) Int. Cl.
*G06F 40/295*  (2020.01)
*G06F 40/49*   (2020.01)

(52) U.S. Cl.
CPC ............ *G06F 40/295* (2020.01); *G06F 40/49* (2020.01)

(58) Field of Classification Search
None
See application file for complete search history.

(56) References Cited

U.S. PATENT DOCUMENTS 9,251,141 B1    2/2016 Gubin et al.
11,593,558 B2 *  2/2023 Xin .................. G06N 3/045
(Continued)

FOREIGN PATENT DOCUMENTS

| CA | 3014309 A1 * | 2/2019 | ........... G06F 40/216 |
| CN | 107992597 A * | 5/2018 | ........... G06F 16/258 |
| WO | WO-2015080558 A1 * | 6/2015 | ........... G06F 40/295 |

OTHER PUBLICATIONS

Antonio Toral and Rafael Muñoz. 2006. A proposal to automatically build and maintain gazetteers for Named Entity Recognition by using Wikipedia. In Proceedings of the Workshop on New Text Wikis and blogs and other dynamic text sources. (Year: 2006).*

(Continued)

*Primary Examiner* — Richemond Dorvil
*Assistant Examiner* — Alexander G Marlow
(74) *Attorney, Agent, or Firm* — Smith Baluch LLP

(57) ABSTRACT

Systems, methods and apparatus are provided for identifying entities in a corpus of text. The system comprising: a first named entity recognition (NER) system comprising one or more entity dictionaries, the first NER system configured to identify entities and/or entity types within a corpus of text based on the one or more entity dictionaries, a second NER system comprising an NER model configured for predicting entities and/or entity types within the corpus of text; and a comparison module configured for identifying entities based on comparing the entity results output from the first and second NER systems, where the identified entities are different to the entities identified by the first NER system. The system may further include an updating module.

43 Claims, 13 Drawing Sheets

(56) References Cited

U.S. PATENT DOCUMENTS

| | | | |
|---|---|---|---|
| 2007/0100814 A1 | 5/2007 | Lee et al. | |
| 2011/0320437 A1* | 12/2011 | Kim | G06F 16/958 707/E17.014 |
| 2013/0173604 A1 | 7/2013 | Li et al. | |
| 2019/0005020 A1* | 1/2019 | Gregory | G06F 18/2411 |

OTHER PUBLICATIONS

S. Keretna, C. P. Lim and D. Creighton, "A hybrid model for named entity recognition using unstructured medical text," 2014 9th International Conference on System of Systems Engineering (SOSE), Glenelg, SA, Australia, 2014, pp. 85-90, doi: 10.1109/SYSOSE. 2014.6892468. (Year: 2014).*

Y. Sari, M. F. Hassan and N. Zamin, "A Hybrid Approach to Semi-supervised Named Entity Recognition in Health, Safety and Environment Reports," 2009 International Conference on Future Computer and Communication, Kuala Lumpar, Malaysia, 2009, pp. 599-602, doi: 10.1109/ICFCC.2009.52. (Year: 2009).*

Antonio Toral and Rafael Muñoz. 2006. A proposal to automatically build and maintain gazetteers for Named Entity Recognition by using Wikipedia. In Proceedings of the Workshop on New Text Wikis and blogs and other dynamic text sources. (Year: 2006).*

Kuniko Saito and Kenji Imamura. 2009. Tag Confidence Measure for Semi-Automatically Updating Named Entity Recognition. In Proceedings of the 2009 Named Entities Workshop: Shared Task on Transliteration (NEWS 2009), pp. 168-176, Suntec, Singapore. Association for Computational Linguistics. (Year: 2009).*

Guillaume Lample, Miguel Ballesteros, Sandeep Subramanian, Kazuya Kawakami, and Chris Dyer. 2016. Neural Architectures for Named Entity Recognition. In Proceedings of the 2016 Conference of the North American Chapter of the Association for Computational Linguistics: Human Language Technologies (Year: 2016).*

Tim Rocktaschel, Michael Weidlich, Ulf Leser, ChemSpot: a hybrid system for chemical named entity recognition, Bioinformatics, vol. 28, Issue 12, Jun. 2012, pp. 1633-1640, https://doi.org/10.1093/bioinformatics/bts 183 (Year: 2012).*

PCT Written Opinion and Search Report issued in connection with related PCT/GB2020/050779 dated Jul. 8, 2020.

Office Action in European App. No. 20717247.9 dated Sep. 11, 2025, 8 pages.

* cited by examiner

NAME ENTITY RECOGNITION WITH DEEP LEARNING

CROSS-REFERENCE TO RELATED PATENT APPLICATIONS

This patent application is the 35 U.S.C. 371 national stage of International Patent Application PCT/GB2020/050779 filed 23 Mar. 2020, which claims the benefit of priority to GB Application 1904167.2 filed 26 Mar. 2019, which is incorporated by reference herein for all purposes to the extent permitted by law.

The present application relates to a system and method for performing name entity recognition with deep learning on large scale datasets such as a corpus of text.

BACKGROUND

Entity recognition within large scale datasets such as a corpus of data or text in one or more fields such as, by way of example only but not limited to, bioinformatic or chem(o)informatic literature (e.g. publications stored by various sources such as, by way of example only but is not limited to, PubMed), is important for identifying entity types, entities of interest, and/or the corresponding entity relationships there between. The large scale dataset or corpus of data/text may comprise or represent any information or data from one or more data source(s), content source(s), content provider(s) and the like and may include, by way of example only but is not limited to, unstructured data/text, structured data/text, a body of text, articles, publications, literature, documents, text, email, images and/or videos, or any other information or data that may contain a wealth of information. This data may be compiled from, generated by and/or stored with/or by one or more sources, content sources/providers, or a plurality of sources (e.g. PubMed, MEDLINE, Wikipedia) and which may be used to form a large scale dataset or corpus of data/text from which entities, entity types and relationships of interest may be extracted. Such large scale datasets or corpus of data/text may include data or information from one or more data sources, where each data source may provide data representative of a plurality of unstructured and/or structured text/documents, documents, articles or literature and the like. Although most documents, articles or literature from publishers, content providers/sources have a particular document format/structure, for example, PubMed documents are stored as XML with information about authors, journal, publication date and the sections and paragraphs in the document, such documents are considered to be part of the corpus of data/text. For simplicity, the large scale dataset or corpus of data/text is referred to herein, by way of example only but is not limited to, a corpus of text.

Named entity recognition (NER) systems with entity dictionaries are typically used to match and extract identified entities, entity types, and/or the positions where the entity types occur within a corpus of text. These NER systems typically use entity dictionaries that are manually curated and annotated in order to reliably match and identify known entities within portions of the corpus of text. For example, when the corpus of text or portions of text being processed includes bioinformatics and chem(o)informatics literature, the entity types can be of a range of types from genes, diseases, through to chemicals and the like etc. There may be greater than 50 million different entity types and/or entities of interest with more being generated every day as scientific research in these fields progress. This is becoming increasingly unmanageable and expensive to manually curate and annotate the entities and/or entity types occurring in such large scale datasets or corpus of text. This is because the number of entities is constantly increasing as research is conducted and discoveries made. For example, when researchers make new discoveries, they may generate names for entities and/or entity types that are different to those that have been previously defined. There is generally no universal accepted standard method of generating names for entities and/or entity types. Thus a key issue with current NER dictionary based methods is that it is both time and resource intensive to manually review new literature/documents in the corpus of text, and manually edit and keep the entity dictionaries up-to-date. Another key issue with current NER methods and systems is the inability to ensure that NER systems are able to identify entities of known and unknown entity types with accuracy. Unreliable NER systems will lead to errors and inaccuracies in downstream processes that use these entity results, where such errors propagate and/or magnify leading to unreliable research aids, tools and/or systems.

For example, text in biological documents or text may include sentences such as, by way of example only but is not limited to, "Paracetamol is good for headaches". These sentences include entity types of interest (e.g. drug, disease/conditions) with corresponding entities (e.g. "Paracetamol", "headache") and relationships there between (e.g. "is good for"). An entity type may comprise or represent at least one entity type from, by way of example only but is not limited to, the group of: gene; disease; compound/drug; protein; chemical entity type, biological entity type; or any other entity type associated with bioinformatics or chem(o)informatics and the like. Entities may comprise or represent entity data based on text that is representative of any entity that belongs to or has a corresponding entity type. When this entity data is extracted it may be used in many applications such as knowledge bases, literature searches, entity-entity knowledge graphs, relationship extraction, generating training datasets for training various machine learning techniques and models, and other processes useful to researchers in the fields of, by way of example only but is not limited to, bioinformatics, chem(o)informatics, drug discovery and the like.

Given the large number of different entities that may be of interest, it is a difficult, if not an impossible, resource intensive task to determine and/or understand which entities and/or entity types would be useful for generating, building and/or augmenting entity dictionaries without any knowledge of their existence in a corpus of text or large-scale body of literature. It is also a daunting and resource intensive task (in terms of time) to manually maintain and update entity dictionaries of an NER dictionary type system. Furthermore, NER dictionary type systems are not adaptable and can mistakenly identify an entity of one type (e.g. "disease") for an entity of another entity type (e.g. "gene") from a piece of text, thus outputting incorrect entity results in the NER process. This can lead to further errors, inaccuracies, and inefficiencies for downstream processes (e.g. relationship extraction, training ML techniques and models, knowledge bases) that rely on the entity results output from an NER system.

NER models may be used that are trained using machine learning techniques to predict entities and/or entity types within a corpus of text. However, the reliability of such NER models to identify and/or validate current and/or new entities and/or entity types of interest can be poor due to out-dated training datasets, which may lead to further inaccuracies and/or inefficiencies in downstream processes.

There is a desire for a more efficient and robust NER system that can ensure both up-to-date and accurate entity dictionaries for more efficient entity recognition. There is also a desire for an NER system to reliably and efficiently generate and/or build entity dictionaries and/or augment existing entity dictionaries of an NER dictionary based systems based on a corpus of text.

The embodiments described below are not limited to implementations which solve any or all of the disadvantages of the known approaches described above.

SUMMARY

This Summary is provided to introduce a selection of concepts in a simplified form that are further described below in the Detailed Description. This Summary is not intended to identify key features or essential features of the claimed subject matter, nor is it intended to be used to determine the scope of the claimed subject matter; variants and alternative features which facilitate the working of the invention and/or serve to achieve a substantially similar technical effect should be considered as falling into the scope of the invention disclosed herein.

The present disclosure provides a solution to the above-mentioned key issues by providing a more robust NER system that can ensure both up-to-date, and accurate dictionaries for more efficient entity recognition. This may be achieved by a combination or coupling of NER systems including, by way of example only but not limited to, an NER dictionary based NER system coupled with trained NER Machine Learning (ML) system, in which sets of entity results from each such system may be analysed to reliably identify additional and/or new entities and/or entity types of interest from the corpus of text/documents in one or more fields of interest. Additionally or alternatively, this may also be achieved by a combination or coupling of one or more entity dictionaries coupled with, by way of example only but not limited to, a trained NER Machine Learning (ML) system, in which a set of entity results from the NER ML system is filtered based on the entity dictionaries to reliably identify additional and/or new entities and/or entity types of interest from the corpus of text/documents in one or more fields of interest.

In a first aspect, the present disclosure provides a system including: a first named entity recognition (NER) system comprising one or more entity dictionaries, the first NER system configured to identify entities and/or entity types within a corpus of text based on the one or more entity dictionaries; a second NER system comprising an NER model configured for predicting entities and/or entity types within the corpus of text; and a comparison module configured for identifying entities based on comparing the entity results output from the first and second NER systems, wherein the identified entities are different to the entities identified by the first NER system.

In a second aspect, the present disclosure provides a named entity recognition system comprising: an NER model configured for predicting entities and/or entity types within a corpus of text; and a comparison module configured for identifying entities based on comparing the entity results output from the NER model with entities stored in one or more entity dictionaries, wherein the additional entities are different to the entities of the one or more entity dictionaries.

Preferably, the system of the second aspect further comprising: another named entity recognition, NER, system comprising one or more entity dictionaries, the another NER system configured to identify entities and/or entity types within a corpus of text based on the one or more entity dictionaries; and wherein the comparison further including comparing entity results output from the NER system and the another NER system, wherein identified entities include those entities that are different to the entities identified by the another NER system.

Preferably, the system of the first and/or second aspects further comprising an updating module configured to update the one or more entity dictionaries based on the identified entities.

Preferably, the system of the first and/or second aspects further comprising a dictionary building module configured to build a set of entity dictionaries based on at least the identified entities.

Preferably, the system of the first and/or second aspects further comprising a training module configured to generate or update the NER model by training a machine learning, ML, technique based on at least the identified entities for predicting entities and/or entity types from the corpus of text.

Preferably, the system of the first and/or second aspects, wherein the ML technique comprises at least one ML technique from the group of: a neural network; a recurrent neural network; a feed-forward neural network; a convolutional neural network; a long short-term memory, LSTM, neural network; a neural network based on LSTM conditional random field, CRF; and any other ML technique for predicting entities and entity types from a corpus of text.

Preferably, the system of the first and/or second aspects, wherein a training module is configured to train the ML technique to generate or update the NER model based on labelled data, the labelled data comprising a plurality of sets of labelled data, in which each set of labelled data comprises a portion of text including one or more entities and the position of each of the one or more entities within the portion of text.

Preferably, the system of the first and/or second aspects, wherein a training module is configured to: generate an additional plurality of sets of labelled data in relation to the identified entities, in which each set of labelled data comprises a portion of text from the corpus of text including one or more of the identified entities corresponding to that portion of text and the position of each of the one or more identified entities within the portion of text; and train an ML technique to update the NER model based on at least the additional plurality of sets of labelled data for predicting entities and/or entity types from the corpus of text.

Preferably, the system of the first and/or second aspects, wherein each set of labelled data further comprises annotations corresponding to one or more entity type labels for each of the one or more identified entities.

Preferably, the system of the first and/or second aspects, the NER model further comprising: a machine learning, ML, model configured for predicting whether an entity and/or entity type is present based on a portion of text; and a classification model configured for classifying the predicted entity(ies) of the portion of text to determine a most likely sequence of entity labels based on the predicted entity(ies) of the portion of text.

Preferably, the system of the first and/or second aspects, the NER model further comprising: an entity word model configured for capturing word embeddings/encodings of known entities within a portion of text; an entity character model configured for capturing character embeddings/encodings of unknown entities within a portion of text; and the machine learning, ML, model further configured for predicting whether an entity and/or entity type is present based on input captured word and/or character embedding(s)/encoding(s) of the portion of text.

Preferably, the system of the first and/or second aspects, wherein model parameters for the entity word model, entity character model, machine learning model and classification model are jointly trained based on a plurality of sets of labelled data, each set of labelled data comprising a portion of text including one or more entities and annotated with one or more entity type labels for each of the one or more entities and the position of each of the one or more identified additional entities within the portion of text.

Preferably, the system of the first and/or second aspects, wherein the ML model is based on a neural network comprising forward and backward hidden states configured for representing a portion of text, wherein the forward and backward hidden states are concatenated together for generating an entity representation of the portion of text.

Preferably, the system of the first and/or second aspects, wherein the neural network is based on a Bi-Long Short Term Memory neural network model and the classification model is based on a conditional random field, CRF, model.

Preferably, the system of the first and/or second aspects, wherein the NER model is further configured for outputting a second set of entity results based on an input corpus of text, the second set of entity results comprising a list of a plurality of matched entities, the entity type of each matched entity, and a position within the text that the matched entities occur.

Preferably, the system of the first and/or second aspects, wherein the comparison module is further configured to compare the entity results output from the NER model with entities stored in the one or more entity dictionaries, wherein an entity of the entity results is identified as an additional entity when that entity is determined to be different to the entities of the one or more entity dictionaries.

Preferably, the system of the first and/or second aspects, wherein a count for each identified additional entity is aggregated, and each identified additional entity with a count over a predetermined threshold are validated based on the context that these identified additional entities appear in the corpus of text.

Preferably, the system of the first aspect and/or second aspects, wherein the comparison module is further configured to determine whether a second set of entity results of the second NER system includes any entities that are identified to be unique compared to the entities of a first set of entity results of the first NER system.

Preferably, the system of the first and/or second aspects, further comprising a validation module configured to validate whether the additional identified entities and/or entity types are valid in relation to the corresponding portions of text from the corpus of text in which they occur.

Preferably, the system of the first and/or second aspects, wherein the validation module is further configured to validate the identified additional entities based on at least one from the group of: an entity matching model based on training a different ML technique for training the model to determine context of the entity; and an ML technique for training a entity type matching model based on an LSTM structure that takes into account the left context and right context of a portion of text containing the entity.

Preferably, the system of the first and/or second aspects, further comprising an aggregation module for aggregating the entity results output from the first NER system and second NER system, wherein the aggregated results include those entities satisfying at least one of the following rules of: if an entity is the same in the entity results of both first and second NER systems in relation to the same corresponding portion of text, then the entity is included in the aggregated results; and if an entity is unique and validated in relation to the corresponding portion of text, then the entity is included in the aggregated results.

In a third aspect, the present disclosure provides a computer-implemented method for identifying entities in a corpus of text, the method comprising: receiving a first set of entity results from a first NER system based on a corpus of text, the first NER system comprising a plurality of entity dictionaries configured for identifying entities and/or entity types from the dictionaries within the corpus of text; receiving a second set of entity results from a second NER system based on the corpus of text, the second NER system comprising an NER model configured for predicting entities and/or entity types within the corpus of text; identifying entities based on comparing the entity results output from the first and second NER systems, wherein the identified entities are different to the entities identified by the first NER system.

In a fourth aspect, the present disclosure provides a computer-implemented method for identifying entities in a corpus of text, the method comprising: receiving a set of entity results from an NER system based on the corpus of text, the NER system comprising an NER model configured for predicting entities and/or entity types within the corpus of text;

identifying entities based on comparing the entity results output from the NER system with entities stored in one or more entity dictionaries, wherein the identified entities are different to the entities of the one or more entity dictionaries.

Preferably, the computer-implemented method of the fourth aspect, further comprising: receiving another set of entity results from another name entity recognition, NER, system based on a corpus of text, the another NER system comprising a plurality of entity dictionaries configured for identifying entities and/or entity types from the dictionaries within the corpus of text; and the comparison further including comparing entity results output from the NER system and the another NER system, wherein identified entities include those entities that are different to the entities identified by the another NER system.

Preferably, the computer-implemented method of the third and/or fourth aspects, further updating the one or more entity dictionaries based on the identified entities.

Preferably, the computer-implemented method of the third and/or fourth aspects, further comprising building a set of entity dictionaries based on at least the identified entities.

Preferably, the computer-implemented method of the third and/or fourth aspects further comprising updating the NER model by training a machine learning, ML, technique based on at least the identified entities for predicting entities and/or entity types from the corpus of text.

Preferably, the computer-implemented method of the third and/or fourth aspects, wherein the ML technique comprises at least one ML technique from the group of: a neural network; a recurrent neural network; a feed-forward neural network; a convolutional neural network; a long short-term memory, LSTM, neural network; a neural network based on LSTM conditional random field, CRF; and any other ML technique for predicting entities and entity types from a corpus of text.

Preferably, the computer-implemented method of the third and/or fourth aspects, further comprising training an ML technique for generating or updating the NER model based on labelled data, the labelled data comprising a plurality of sets of labelled data, in which each set of labelled data comprises a portion of text including one or more entities and the position of each of the one or more entities within the portion of text.

Preferably, the computer-implemented method of the third and/or fourth aspects, further comprising: generating an additional plurality of sets of labelled data in relation to the identified entities, in which each set of labelled data comprises a portion of text from the corpus of text including one or more of the identified entities corresponding to that portion of text and the position of each of the one or more identified entities within the portion of text; training an ML technique to update the NER model based on at least the additional plurality of sets of labelled data for predicting entities and/or entity types from the corpus of text.

Preferably, the computer-implemented method of the third and/or fourth aspects, wherein each set of labelled data further comprises annotations corresponding to one or more entity type labels for each of the one or more entities.

Preferably, the computer-implemented method of the third and/or fourth aspects, wherein the NER model further comprises: a machine learning, ML, model configured for predicting whether an entity(ies) and/or entity type(s) is present based on a portion of text; and a classification model configured for classifying the predicted entity(ies) of the portion of text to determine a most likely sequence of entity labels based on the predicted entity(ies) of the portion of text.

Preferably, the computer-implemented method of the third and/or fourth aspects, wherein the NER model further comprises: an entity word model configured for capturing word embeddings/encodings of known entities within a portion of text; an entity character model configured for capturing character embeddings/encodings of unknown entities within a portion of text; and the machine learning, ML, model further configured for predicting whether an entity and/or entity type is present based on input captured word and/or character embedding(s)/encoding(s) of the portion of text.

Preferably, the computer-implemented method of the third and/or fourth aspects, further comprising jointly training model parameters for the entity word model, entity character model, machine learning model and classification model are based on a plurality of sets of labelled data, each set of labelled data comprising a portion of text including one or more entities and annotated with one or more entity type labels for each of the one or more entities and the position of each of the one or more identified entities within the portion of text.

Preferably, the computer-implemented method of the third and/or fourth aspects, wherein the ML model is based on a neural network comprising forward and backward hidden states configured for representing a portion of text, wherein the forward and backward hidden states are concatenated together for generating an entity representation of the portion of text.

Preferably, the computer-implemented method of the third and/or fourth aspects, wherein the neural network is based on a Bi-Long Short Term Memory neural network model and the classification model is based on a conditional random field, CRF, model.

Preferably, the computer-implemented method of the third and/or fourth aspects, further comprising outputting from the NER model a second set of entity results based on an input corpus of text, the second set of entity results comprising a list of a plurality of matched entities, the entity type of each matched entity, and a position within the text that the matched entities occur.

Preferably, the computer-implemented method of the third and/or fourth aspects, wherein comparing the entity results output from the NER model further comprises comparing the entity results with entities stored in the one or more entity dictionaries, wherein an entity of the entity results is identified as an additional entity when that entity is determined to be different to the entities of the one or more entity dictionaries.

Preferably, the computer-implemented method of the third and/or fourth aspects, further comprising aggregating a count for each identified entity, and validating each identified entity with a count over a predetermined threshold based on the context that these identified entities appear in the corpus of text.

Preferably, the computer-implemented method of the third aspect, wherein comparing further comprises determining whether a second set of entity results of the second NER system includes any entities that are identified to be unique compared to the entities of a first set of entity results of the first NER system.

Preferably, the computer-implemented method of the fourth aspect, wherein comparing further comprises determining whether a set of entity results of the NER system includes any entities that are identified to be unique compared to the entities of a set of entity results of the another NER system.

Preferably, the computer-implemented method of the third and/or fourth aspects, further comprising validating whether the identified entities and/or entity types are valid in relation to the corresponding portions of text from the corpus of text in which they occur.

Preferably, the computer-implemented method of the third and/or fourth aspects, wherein validating further comprises validating the identified entities based on at least one from the group of: an entity matching model based on training a different ML technique for training the model to determine context of the entity; and an ML technique for training a entity type matching model based on an LSTM structure that takes into account the left context and right context of a portion of text containing the entity.

Preferably, the computer-implemented method of the third aspect, further comprising aggregating the entity results output from the first NER system and second NER system, wherein the aggregated results include those entities satisfying at least one of the following rules of: if an entity is the same in the entity results of both first and second NER systems in relation to the same corresponding portion of text, then the entity is included in the aggregated results; and if an entity is unique and validated in relation to the corresponding portion of text, then the entity is included in the aggregated results. As an option, another rule may be based on: if there is an overlap of different entities between the entity results of the first and second NER systems in relation to the same corresponding portion of text, then validate each of the different entities in relation to the portion of text and only include the validated entity in aggregated results.

Preferably, the computer-implemented method of the fourth aspect, further comprising aggregating the entity results output from the NER system and the another NER system, wherein the aggregated results include those entities satisfying at least one of the following rules of: if an entity is the same in the entity results of both the NER system and the another NER systems in relation to the same corresponding portion of text, then the entity is included in the aggregated results; and if an entity is unique and validated in relation to the corresponding portion of text, then the entity is included in the aggregated results. As an option, another rule may be based on: if there is an overlap of different entities between the entity results of the NER system and the another NER system in relation to the same corresponding portion of text, then validate each of the different entities in relation to the portion of text and only include the validated entity in aggregated results.

Preferably, the systems or computer-implemented methods of the first, second, third, fourth, fifth, sixth, seventh, eighth, ninth or tenth aspects, wherein an entity comprises entity data associated with an entity type from the group of: gene; disease; compound/drug; protein; chemical, organ, biological; or any other entity type associated with bioinformatics or chem(o)informatics and the like. Preferably, the systems or computer-implemented methods of the first, second, third, fourth, fifth, sixth, seventh, eighth, ninth or tenth aspects, wherein the corpus of text includes a plurality of unstructured text and/or a plurality of structured text associated with chem(o)informatic and/or bioinformatic literature, text, articles and the like, combinations and/or modifications thereof, and/or as described herein.

In a fifth aspect, the present disclosure provides a machine learning (ML) model obtained from the computer-implemented methods according to the third and/or fourth aspects, combinations and/or modifications thereof, as claimed herein, and/or as described herein.

In a sixth aspect, the present disclosure provides a NER model obtained from the computer-implemented methods according to the third and/or fourth aspects, combinations and/or modifications thereof, as claimed herein, and/or as described herein.

In a seventh aspect, the present disclosure provides an apparatus comprising a processor, a memory unit and a communication interface, wherein the processor is connected to the memory unit and the communication interface, wherein the processor and memory are configured to implement the computer-implemented methods according to the third and/or fourth aspects, combinations and/or modifications thereof, as claimed herein, and/or as described herein.

In an eighth aspect, the present disclosure provides an apparatus comprising a processor, a memory unit and a communication interface, wherein the processor is connected to the memory unit and the communication interface, wherein the processor and memory are configured to implement an ML model and/or NER model according to the fifth and/or sixth aspects, combinations and/or modifications thereof, as claimed herein, and/or as described herein.

In a ninth aspect, the present disclosure provides a computer-readable medium comprising data or instruction code stored thereon, which when executed on a processor, causes the processor to implement the computer-implemented methods according to any of the third, fourth, fifth, and/or sixth aspects, combinations and/or modifications thereof, as claimed herein, and/or as described herein.

In a tenth aspect, the present disclosure provides a tangible computer-readable medium comprising data or instruction code stored thereon, which when executed on a processor, causes the processor to implement the computer-implemented methods according to any of the third, fourth, fifth, and/or sixth aspects, combinations and/or modifications thereof, as claimed herein, and/or as described herein.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

This application acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example only, with reference to the following drawings, in which.

DETAILED DESCRIPTION

Figure 1A:
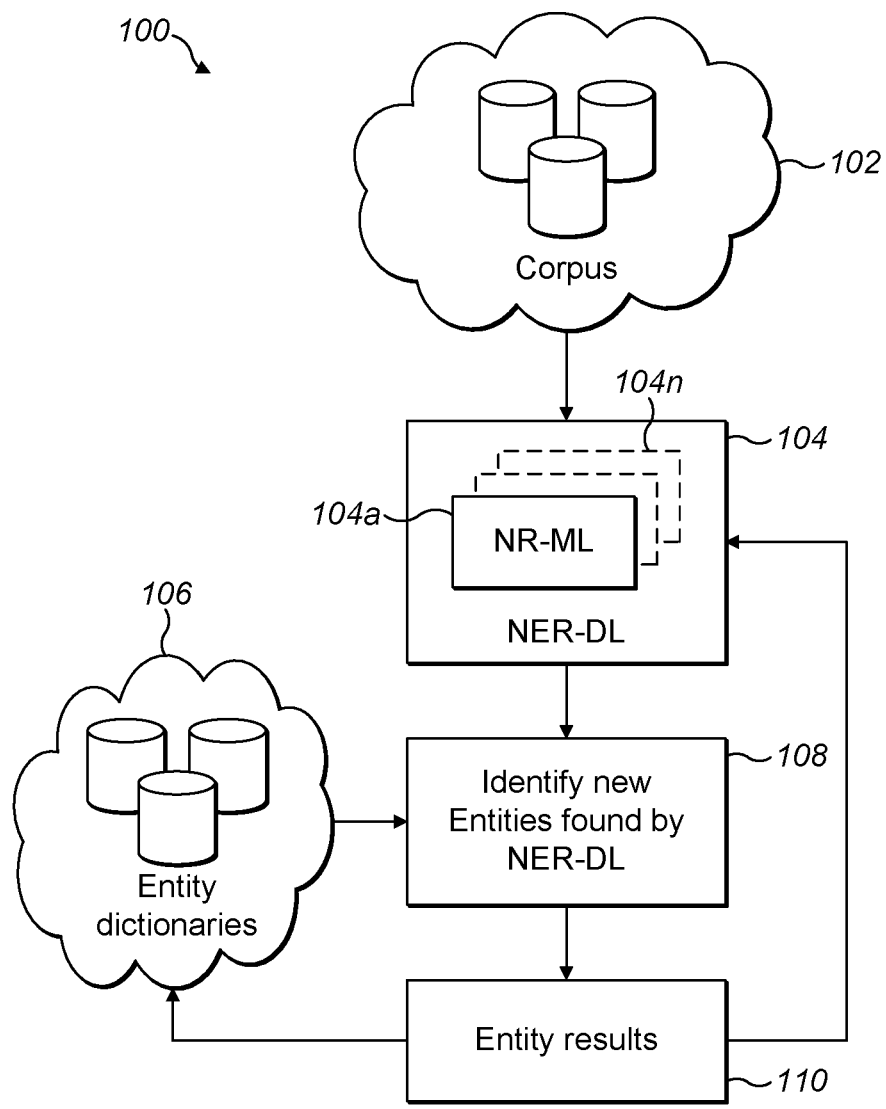
FIG. 1a is a schematic diagram illustrating an example name entity recognition (NER) Deep Learning system according to the invention.

Embodiments of the present invention are described below by way of example only. These examples represent the best mode of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

Entity recognition within a corpus of text such as bioinformatic or chem(o)informatic literature, is important for identifying entities and/or entity types of interest, the corresponding entities and the relationship between them and the like. Named entity recognition (NER) systems are typically used to extract the identified entities, entity types, and/or the positions where the entity types occur within the text. These NER systems typically use entity dictionaries that are manually annotated in order to identify entities within text. In bioinformatics and/or chem(o)informatics, the entity types can be of a range of types such as genes, diseases, chemicals etc. and the number of entities and/or entity types are constantly increasing as further research in these fields is conducted, which add to the body of human knowledge and forms an increasingly large amount of a corpus of text/documents such as, by way of example only but not limited to, research related text and/or documents; conference and journal papers; articles; published patents; news articles and the like.

There are several key issues with conventional NER entity dictionary based methods which are: time and resource intensive to manually edit and keep the entity dictionaries accurate and up-to-date given the increasing size of the corpus of text/documents in any one field of research and the like; inability to ensure that the conventional NER systems are able to identify entity types with accuracy, where when there is ambiguity between identified entities and entity types, the systems default to a predetermined hierarchy or standard order of entity types, which can lead to inaccurate or unreliable entity identification; as well, unreliable or inaccurate NER systems lead to magnification and/or propagation of errors in downstream processes that use these entity results.

The corpus of text may include unstructured or structured documents/text and the like. An unstructured document or text may differ from a structured document or text in that the unstructured document or text does not include type labels indicating the meaning or function of portions of text, character strings and the like within the unstructured document or text. For example, an unstructured document may include a plurality of unstructured portions of text, sentences, or character strings and the like, that are not associated with an entity type label. An unstructured document may also include partial structured information and unstructured information, which can be further structured based on NER techniques and the like.

The invention provides a solution to the above-mentioned key issues by providing a more robust NER system that can ensure both up-to-date, and accurate dictionaries for more efficient entity recognition. The invention is directed to overcoming these key issues by a judicious combination or coupling of NER systems including an NER dictionary based NER systems coupled with trained NER Machine Learning (ML) systems, in which sets of entity results from each such system may be analysed to reliably identify additional and/or new entities and/or entity types of interest from the corpus of text/documents in one or more fields of interest. The invention may also overcome these key issues by judicious combination or coupling of one or more entity dictionaries coupled with a trained NER Machine Learning (ML) system, in which a set of entity results from the NER ML system is filtered based on the entity dictionaries to reliably identify additional and/or new entities and/or entity types of interest from the corpus of text/documents in one or more fields of interest.

ML technique(s) are used to train and generate one or more trained models or classifiers having the same or a similar output objective associated with input data. ML technique(s) may comprise or represent one or more or a combination of computational methods that can be used to generate analytical models, classifiers and/or algorithms that lend themselves to solving complex problems such as, by way of example only but is not limited to, prediction and analysis of complex processes and/or compounds; classification of input data in relation to one or more relationships. ML techniques can be used to generate analytical models associated with compounds for use in the drug discovery, identification, and optimization and other related informatics, chem(o)informatics and/or bioinformatics fields.

Examples of ML technique(s) that may be used by the invention as described herein may include or be based on, by way of example only but is not limited to, any ML technique or algorithm/method that can be trained on a labelled and/or unlabelled datasets to generate a model or classifier associated with the labelled and/or unlabelled dataset, one or more supervised ML techniques, semi-supervised ML techniques, unsupervised ML techniques, linear and/or non-linear ML techniques, ML techniques associated with classification, ML techniques associated with regression and the like and/or combinations thereof. Some examples of ML techniques may include or be based on, by way of example only but is not limited to, one or more of active learning, multitask learning, transfer learning, neural message parsing, one-shot learning, dimensionality reduction, decision tree learning, association rule learning, similarity learning, data mining algorithms/methods, artificial neural networks (NNs), deep NNs, deep learning, deep learning ANNs, inductive logic programming, support vector machines (SVMs), sparse dictionary learning, clustering, Bayesian networks, reinforcement learning, representation learning, similarity and metric learning, sparse dictionary learning, genetic algorithms, rule-based machine learning, learning classifier systems, and/or one or more combinations thereof and the like.

Some examples of supervised ML techniques may include or be based on, by way of example only but is not limited to, ANNs, DNNs, association rule learning algorithms, a priori algorithm, Eclat algorithm, case-based reasoning, Gaussian process regression, gene expression programming, group method of data handling (GMDH), inductive logic programming, instance-based learning, lazy learning, learning automata, learning vector quantization, logistic model tree, minimum message length (decision trees, decision graphs, etc.), nearest neighbour algorithm, analogical modelling, probably approximately correct learning (PAC) learning, ripple down rules, a knowledge acquisition methodology, symbolic machine learning algorithms, support vector machines, random forests, ensembles of classifiers, bootstrap aggregating (BAGGING), boosting (meta-algorithm), ordinal classification, information fuzzy networks (IFN), conditional random field, anova, quadratic classifiers, k-nearest neighbour, boosting, sprint, Bayesian networks, Naïve Bayes, hidden Markov models (HMMs), hierarchical hidden Markov model (HHMM), and any other ML technique or ML task capable of inferring a function or generating a model from labelled training data and the like.

Some examples of unsupervised ML techniques may include or be based on, by way of example only but is not limited to, expectation-maximization (EM) algorithm, vector quantization, generative topographic map, information bottleneck (IB) method and any other ML technique or ML task capable of inferring a function to describe hidden structure and/or generate a model from unlabelled data and/or by ignoring labels in labelled training datasets and the like. Some examples of semi-supervised ML techniques may include or be based on, by way of example only but is not limited to, one or more of active learning, generative models, low-density separation, graph-based methods, co-training, transduction or any other a ML technique, task, or class of supervised ML technique capable of making use of unlabeled datasets and labelled datasets for training (e.g. typically the training dataset may include a small amount of labelled training data combined with a large amount of unlabeled data and the like.

Some examples of artificial NN (ANN) ML techniques may include or be based on, by way of example only but is not limited to, one or more of artificial NNs, feedforward NNs, recurrent NNs (RNNs), Convolutional NNs (CNNs), autoencoder, long short-term memory (LSTM), LSTM-conditional random fields (CRF), Bi-directional LSTM, Bi-directional LSTM-CRF, recursive artificial NNs, extreme learning machines, logic learning machines, self-organizing maps, and other ANN ML technique or connectionist system/computing systems inspired by the biological neural networks that constitute animal brains and capable of learning or generating a model based on labelled and/or unlabelled datasets. Some examples of deep learning ML technique may include or be based on, by way of example only but is not limited to, one or more of deep belief networks, deep Boltzmann machines, DNNs, deep CNNs, deep RNNs, hierarchical temporal memory, deep Boltzmann machine (DBM), stacked Auto-Encoders, and/or any other ML technique capable of learning or generating a model based on learning data representations from labelled and/or unlabelled datasets.

For simplicity and by way of example only, the present invention may be described using ML techniques (aka Deep learning techniques) capable of learning from labelled datasets based on any ML technique or algorithm from the group of: a neural network; a recurrent neural network; a feedforward neural network; a convolutional neural network; a long short-term memory, LSTM, neural network; a neural network based on LSTM CRF; or combinations thereof; and/or any other ML technique suitable for training an name entity recognition (NER) machine learning (ML) model in predicting, identifying, and/or classifying entities and/or entity types from a corpus of text/documents and the like. Once trained, the trained NER model is configured for predicting, identifying, and/or classifying matched entities, the entity type of each matched entity, and/or a position within the text or portions thereof that the matched entities occur.

FIG. 1a is a schematic diagram illustrating an example name entity recognition (NER) Deep Learning (DL) system 100 (NER-DL system) according to the invention. The NER-DL system 100 includes a corpus of text or documents 102, which may be input to an NER Machine Learning (ML) system 104 (NER-ML system) including one or more NER-ML models 104a-104n, an entity identification module 108 for identifying new entities that are different to the entities of one or more entity dictionaries 106, and an entity results module 110 for using the new identified entities for updating or building entity dictionaries and/or training of the one or more NER-ML models 104a-104n.

In operation, the corpus of text or documents may include, by way of example only but is not limited to, a corpus of bioinformatic and/or chem(o)informatic literature, text or documents. The NER-ML system 104 may include one or more NER-ML models 104a-104n. An NER-ML model may be configured for predicting entities and/or entity types within the corpus of text 102. An NER-ML model may be a multi-class ML model that may be trained and configured to predict and/or identify entities of multiple entity types. Alternatively or additionally, a single class NER-ML model may be trained and configured for predicting and/or identifying entities of a particular entity type. The NER-ML system 104 may be based on one or more NER-ML models 104a-104n for processing the corpus of text 102 and for outputting a set of entity results associated with portions of text of the corpus of text. The set of entity results may comprise or represent data representative of entities and/or entity types found in relation to portions of text of the corpus of text and/or positions in which the entities/entity types are located within the portions of text.

Once the NER-ML system 104 has been trained, the corpus of text 102 may be input to each of the one or more NER-ML model(s) 104a-104n, each of which outputs a set of entity results to the entity identification module 108. The entity identification module 108 is configured for identifying additional or new entities and/or entity types based on comparing the set of entity results output from the NER-ML model(s) 104a-104n with entities and/or entity types stored in one or more corresponding entity dictionaries 106. Each of the entity dictionaries 106 may include entities that correspond to a particular entity type. The new or additional entities and/or entity types that are different to the entities and/or entity types of the one or more entity dictionaries are identified as a set of new entity results.

The entity results module 110 may be configured to automatically and/or semi-automatically validate and/or use the new entity results for, by way of example only but is not limited to: a) updating or augmenting one or more of the entity dictionaries 106; b) building one or more entity dictionaries for a new entities and/or entity types based on the new entity results (e.g. new entity types); c) generating or updating training datasets for use in updating and/or re-training at least one of the one or more NER-ML models 104a-104n of the NER-ML system 104; d) generating or updating training datasets for use in training additional NER-ML models based on one or more other ML techniques and the like.

Figure 1B:
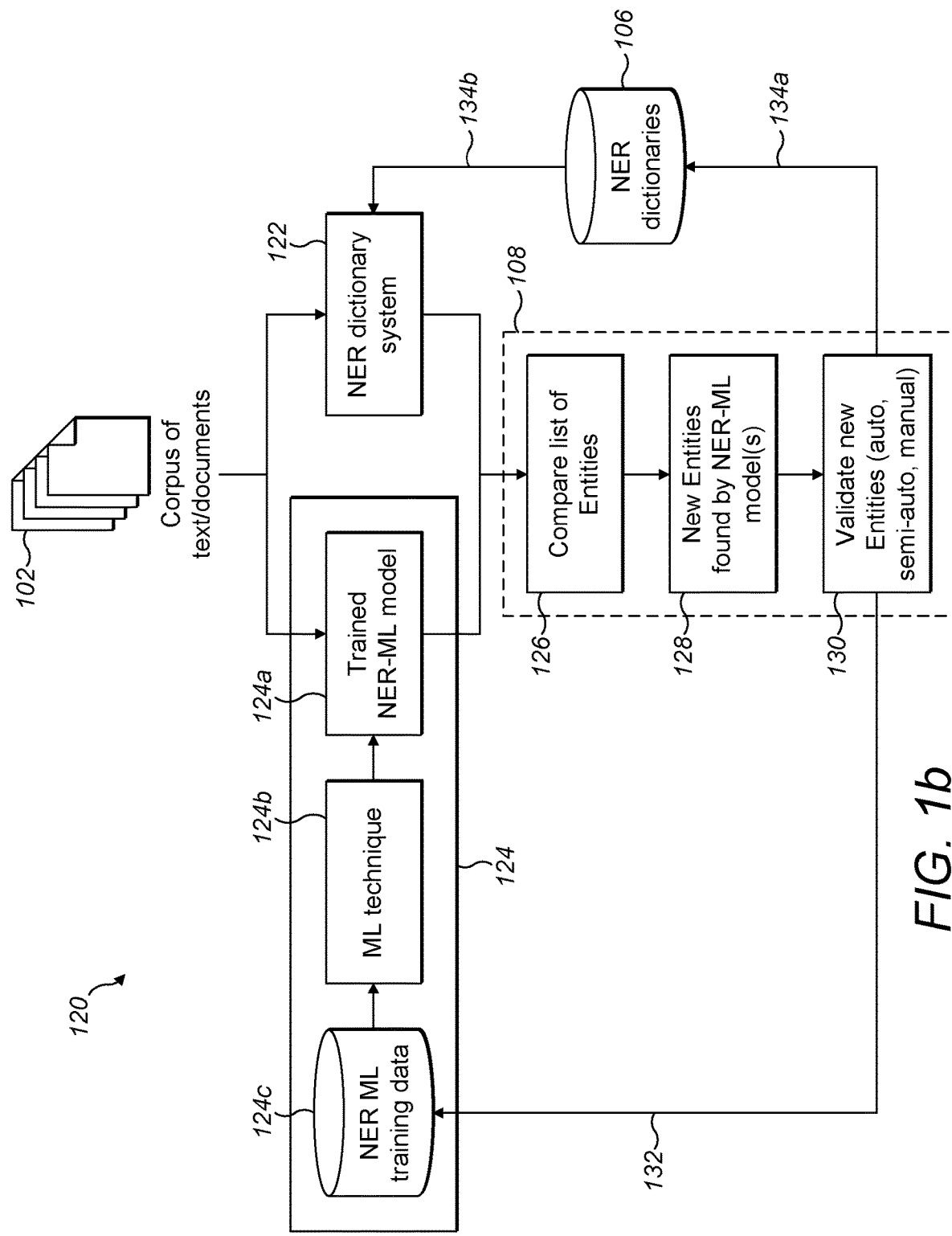
FIG. 1b is schematic diagram illustrating another example NER Deep Learning (NER-DL) system according to the invention.

FIG. 1b is schematic diagram illustrating another example NER-DL system 120 based on the NER-ML system 104 of FIG. 1a in accordance with the invention. In this example, the NER-DL system 120 includes a first NER system 122 including one or more entity dictionaries 106, i.e. a NER dictionary-based system. The first NER system 122 is configured to identify entities and/or entity types within the corpus of text 102 based on the one or more entity dictionaries. For example, the NER system 122 may use the entity dictionaries to match entities in the dictionaries 106 with entities found in the corpus of text 102. The NER-DL system 120 may further include a second NER system 124 based on, by way of example only but is not limited to, the NER-ML system 104 of FIG. 1a. In this example, the second NER system 122 includes an NER-ML model 124a trained and configured for predicting entities and/or entity types within the corpus of text 102. The NER-ML model 124a may be generated by training an ML technique 124b based on NER-ML training dataset 124c. The NER-ML training dataset 124c may include data representative of portions of text, each portion of text labelled with corresponding one or more entities and/or entity types, and/or annotated with positions of the corresponding one or more entities and/or entity types.

A corpus of text 102 may be input to the first and second NER systems 122 and 124 for processing by the first NER system 122 and the trained NER-ML model 124a of the second NER system 124, each of which may output a corresponding set of entity results. The first NER system 122 may output a first set of entity results identifying one or more entities and/or entity types in portions of the corpus of text 102. The second NER system 124 may output a second set of entity results identifying one or more entities and/or entity types in portions of the corpus of text 102. It is noted that the first set of entity results and second set of entity results may differ because the first and second NER systems 122 and 124 are configured differently. Given this, the sets of entity results are input to entity identification module 108, which may include a entity comparison module 126, entity collation module 128 and entity validation module 130. The entity comparison module 126 may be configured for identifying entities based on comparing the first set of entity results output from the first NER system 122 with the second set of entity results output from the second NER system 124, where the identified entities are different to the entities identified by the first NER system. The collation module 128 may be configured to collate the identified entities as new or additional entities and/or entity types that are identified from the corpus of text 102. These may be entities that the first NER system 122 may have been unable to identify or accurately identify.

The entity validation module 130 may be configured for validating the identified entities prior to using the identified entities in a) enhancing the training dataset 124c via path 132 and/or b) building new entity dictionaries and/or updating or augmenting entity dictionaries 106 via path 134a. The enhanced training dataset 124c may be used to update the NER-ML model 124a via further training of the corresponding ML technique 124b. The updated or additional entity dictionaries 106 may be used by the first NER system 122 for further identifying entities from the corpus of text 102. The corpus of text 102 may be updated due to new research and/or literature being generated by scientists/researchers in the relevant fields of research, e.g. bioinformatics and/or chem(o)informatics. Thus, the process may repeat with further new or additional entities being identified using the combination of the first NER dictionary based system 122 and second NER-ML-based system 122.

The NER-DL system 120 may be used for, by way of example only but is not limited to, dictionary building and/or augmenting entity dictionaries 106. Although in this example, only one NER-ML model 124a is illustrated in the second NER system 124 (or NER-ML system), the second NER system 124 may be configured based on one or more NER-ML model(s) each of which may be trained based on NER-ML training entity dataset 124c, which is used by corresponding one or more ML technique(s) 124c for generating the corresponding one or more NER-ML model(s) 124a.

An NER-ML model 124a may be based on any one or more ML technique(s) such as, by way of example only but is not limited to, neural network techniques including, by way of example only but not limited to, one or more from the group of: a recurrent neural network (RNN); a feed-forward neural network (FFNN); a convolutional neural network (CNN); a long short-term memory (LSTM) neural network; a neural network based on LSTM conditional random fields (CRF); a bi-directional LSTM; a bi-directional LSTM-CRF; combinations thereof; modifications thereof; and/or any other ML technique and/or classification techniques for predicting and/or labelling entities and entity types from portions of text in a corpus of text 102. The ML technique(s) 124b of the NER-ML model 124a may be based on a neural network structure that is trained to operate at the word and/or character level of portions of text (e.g. sentences or paragraphs) from the corpus of text 102 for predicting one or more entities and/or entity types and/or positions thereof. For example, the NER-ML model 124a may be trained to be based on a bidirectional LSTM CRF neural network structure that operates at the word and/or character level of portions of text from a corpus of text 102.

The second NER system 124 is used to process a corpus of text/documents 102 to identify a plurality of entities for each entity type (or one or more entity types) that the NER-ML model 124a has been trained to identify. However, given that the NER-ML model 124a may be based on neural network type structures, it includes the property of being able to predict and/or identify unknown entities and/or entity types that classical dictionary-based NER systems 122 may be unable to identify/classify or may incorrectly identify/classify. As described with reference to FIG. 1a, the NER-ML model 124a may be a multi-class model, multiple multi-class models, and/or a plurality of single-class models for outputting data representative of predicted, identified and/or found entities, associated entity types, and/or positions of entities within portions of text of the corpus of text 102. A multi-class NER-ML model 124a may be trained and configured to identify entities of multiple entity types from portions of the corpus of text 102. A single-class NER model 124a may be trained and configured to identify entities of a particular entity type from portions of the corpus of text 102. Thus, multiple single class NER-ML models 124a, each trained and configured to identify entities of a particular entity type, may be used to identify entities of multiple entity types simultaneously.

The entity identification module 108 is configured to identify new or additional entities, from the sets of entity results from the first and second NER systems 122 and 124. The new or additional entities can be identified using comparison module 126, which compares the differences between the entities already found, validated and identified (e.g. entities in entity dictionaries 106) and the sets of entity results output from the second NER system 124, which are collated into new entities by entity collation module 128. The entity validation module 130 may validate the new entities, and those validated new entities may be used to build further entity dictionaries, and/or added to the correspondingly generated entity dictionaries 106. Alternatively or additionally, the validated new entities may also be used update or re-generate NER-ML training dataset(s) 124c for use in training new NER-ML models, and/or updating/retraining current the NER-ML model(s) 124a for predicting/identifying further entities from the corpus of text 102.

It is noted that the corpus of text 102 may be updated regularly or continuously based on new information, discoveries, articles, documents, text and the like that may be generated by scientists and/or researchers in the corresponding field(s) associated with the corpus of text. For example, the corpus of text may be based in the field of bioinformatics and/or chem(o)informatics and include bioinformatics/chem(o)informatics articles, patents, literature and the like that are published or stored in one or more databases and the like. Thus, the first NER system 122 with updated entity dictionaries 106 and the second NER-ML-based system 124 with updated/retrained NER-ML model(s) 124a may be used to process the updated corpus of text 102 for identifying further entities and/or entity types and/or positions thereof within portions of text of the corpus of text 102.

As described with reference to FIG. 1a, the second NER system 124 processes the corpus of text 102 to output entity results, which may be compared by the entity comparison module 126 with current entities stored in one or more of the entity dictionaries 106. Additionally or alternatively, the second NER system 124 entity results may be compared with entity results output from the first NER system 122, and/or current entities stored in one or more entity dictionaries 106. Those entity results that are different to those entities stored in the one or more entity dictionaries 106, and/or the entity results from the first NER system 122 may be considered to be new entities.

The entity collation module 128 may collate these new entities and determine the frequency in which each new entity occurs. For example, each new entity may have an entity frequency count that is increased when each new entity occurs in the entity results during processing of the corpus of text 102. Those entities with entity counts greater than or equal to a predetermined entity count threshold (or a set artificial threshold) may be selected for validation. Those entities with entity counts below the predetermined entity count threshold may be discarded, which further reduces identification inaccuracies in relation to new entities. The entities that are selected for validation by the entity collation module 128 are provided to the validation module 130 for automatic, semi-automatic and/or manual validation of the entity and/or entity types. Once these entities are validated, the validated new entities and/or entity types may be used to generate new entity dictionaries for new entity types, and/or augment existing entity dictionaries 106.

The entity collation module 108 may further include an aggregation module for aggregating the entity results output from the first NER system and second NER system, where the aggregated results include those entities satisfying at least the following rules of: if an entity is unique and validated in relation to the corresponding portion of text, then the entity is included in the aggregated results; if an entity is the same in the entity results of both first and second NER systems in relation to the same corresponding portion of text, then the entity is included in the aggregated results; and if there is an overlap of different entities between the entity results of the first and second NER systems in relation to the same corresponding portion of text, then each of these differing entities are validated in relation to the portion of text and only include the validated entity in aggregated results. The validation may be performed based on the entity validation module 130 as described below.

The automated/semi-automated processes that may be used by the entity validation module 130 may be based on an entity matching or string similarity-based ML model generated by training an ML technique for predicting whether an entity is valid or not or predicting the probability whether an entity is valid or not. Such models may be implemented based on Levenshtein distance-based comparison. An example of a string similarity-based ML model may be an alignment model based on a neural network structure, in which data representative of the entity is input. For example, a character level RNN type structure may be used to operate on data representative of an entity to generate an alignment/similarity matrix at the character level, where a Convolutional Neural Network structure may be used to filter the alignment/similarity matrix to determine a score as to whether the input entity is valid of not. Additionally or alternatively, entity validation may further include using entity candidate representations generated based on character level models like fastText and/or based on word level contextual embedding model(s) such as, by way of example only but not limited to, deep contextualised word representation techniques such as, by way of example only but no limited to, deep Bidirectional Encoder Representations from Transformers (BERT), BERT for Biomedical text (BioBERT), or ELMO and the like. Additionally or alternatively, the validated entities may be manually validated by an operator or user, the results of which may be fed back to update the entity matching and/or string similarity-based ML model. Theoretically, this will reduce the need or necessity for an operator or user to manually validate all new entities that are identified. The entity validation module 130 is configured to ensure that the newly identified entities and their corresponding entity types are valid given the context that they appear in the text portions of the corpus of text 102. Those new entities that are valid, or the validated new entities, may be used to build new entity dictionaries, and/or augment/update one or more of the plurality of dictionaries 106, and/or for generated further training datasets for updating NER-ML models of the second NER system 124 or training additional NER-ML models and the like.

It is noted that an entity may be represented by one or more synonyms (alternative written forms) of that entity. The NER-ML model(s) 124a may, based on the training dataset used to train the corresponding ML technique(s) 124b, predict and/or identify new synonyms of existing entities. For example, an entity that is a gene or a disease may each have multiple written forms (e.g. a gene always has a short and long form). Entities commonly have many more synonyms that may arise from different representations of e.g. Greek letters, different naming conventions, acronyms, different spellings etc. Should the NER-ML model 124a predict/identify a new entity that is unknown or has not been identified before, then this may trigger the automated/semi-automated process of the entity validation module 130 to notify a user for manually checking the unknown entity/entity type and the like. If the entity is a valid new and unknown entity, the user may make a decision which is notified to the NER-DL system 100, 120 and/or 140 for including the entity into the appropriate entity dictionary 106. The NER-ML model(s) 124a may also be further updated based on the new identified entities to improve these NER-ML model's performance on further portions of text or updated text of the corpus of text 102.

The NER-DL system 120 may be part of a processing pipeline and combined with other systems, for example relationship extraction systems, drug discovery ML systems and the like, where the NER-DL system 120 identifies and finds all words or character strings in a corpus of text 102 that could be an entity with a corresponding entity type and passes these to the downstream systems. For example, a downstream relationship extraction system may receive data representative of a set of identified entities, entity types and positions of the identified entities within the corpus of text 102 and make an assessment, on whether one or more of these identified entities (e.g. word(s) or character strings) correspond to a relationship or have a relationship with one or more other identified entity(ies) and the like. The relationship extraction system may then generate entity pairs with relationships there between, which may be used to generate or update relationship extraction training datasets (e.g. entity pairs and relationships there between, with positions of the entities, relationships within portions of text of the corpus of text 102) for training one or more ML techniques to generate further ML models for predicting, identifying, and/or classifying new products and/or processes (e.g. new chemicals, drugs or treatments) associated with the entities and relationships there between.

Figure 1C:
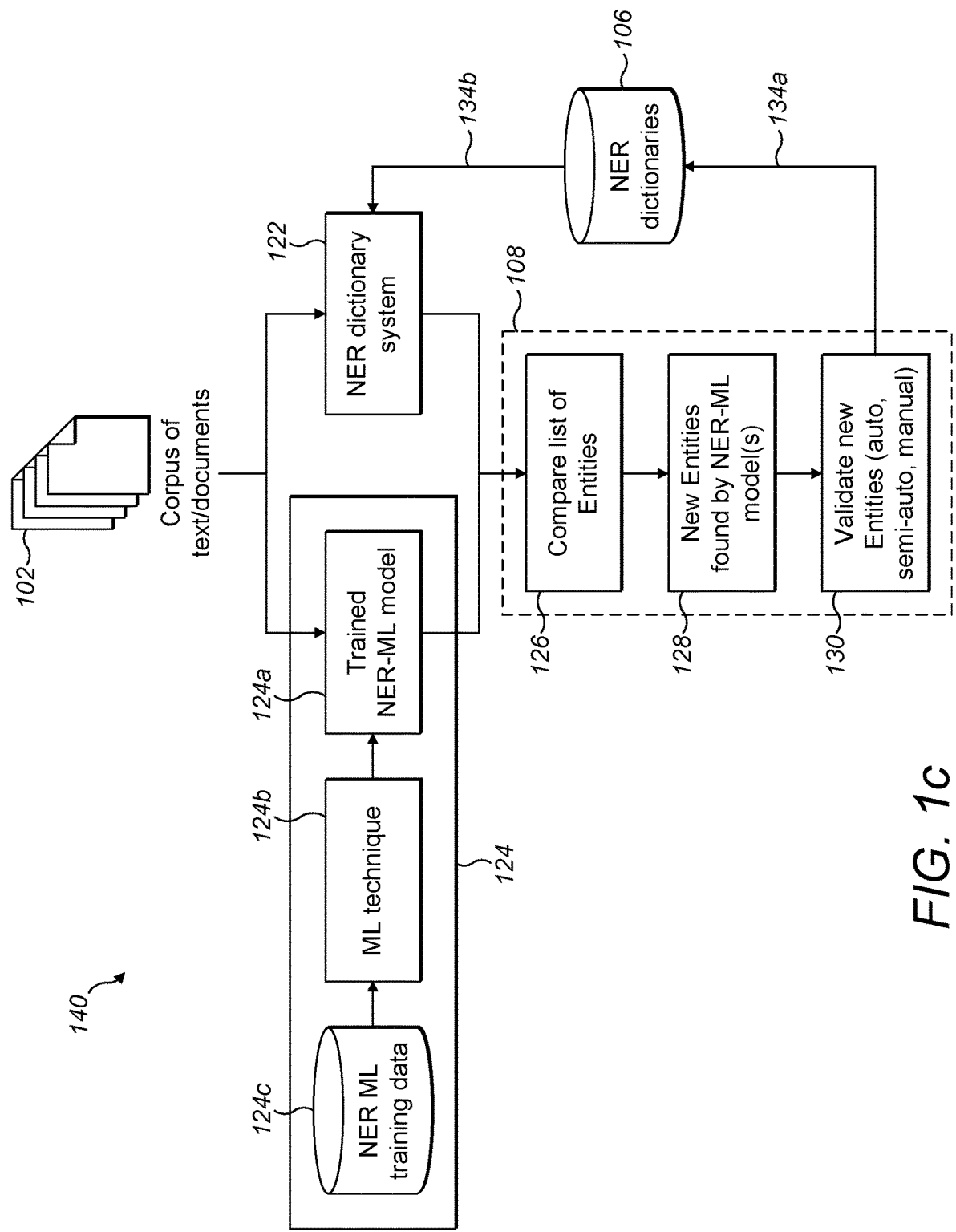
FIG. 1c is schematic diagram illustrating a further example NER-DL system according to the invention.

FIG. 1c is schematic diagram illustrating a further example NER-DL system 140 based on the NER-DL systems 100 and/or 120 of FIGS. 1a and 1 b according to the invention. The NER-DL system 140 may be configured for augmenting and/or building entity dictionaries 106. The first NER system 122 is an entity dictionary based NER system that uses entity dictionaries 106 for identifying entities within the corpus of text 102. The second NER system (or NER-ML system) 124 is based on one or more ML models which are trained and configured for predicting and/or identifying entities and/or entity types within the corpus of text 102. Both the first and second NER systems 122 and 124 process the corpus of text 102 to output a first and second set of entity results, respectively, that are associated with portions of text in the corpus of text 102. The entity identification module 108 uses the entity comparison module 126, entity collation module 128 and entity validation module 130 to identify additional or new entities and/or entity types. Initially, the entity comparison module 126 compares the first and second sets of entity results with each other to determine whether the second set of entity results includes any entities and/or corresponding entity types that are different compared with the entities and corresponding entity types of the first set of entity results. Those entities that are different compared to those of the first set of entity results may be initially tagged or considered as new entities. These tagged and/or new entities may be collated by the entity collation module 126, which may then be further validated by the entity validation module 130. Any new entity types may be used to generate, build and populate new entity dictionaries, each corresponding to a particular new entity type, with entities associated with the corresponding new entity type. Additionally or alternatively, the new entities may be used to generate and/or build new entity dictionaries and/or augment current entity dictionaries 106.

Figure 1D:
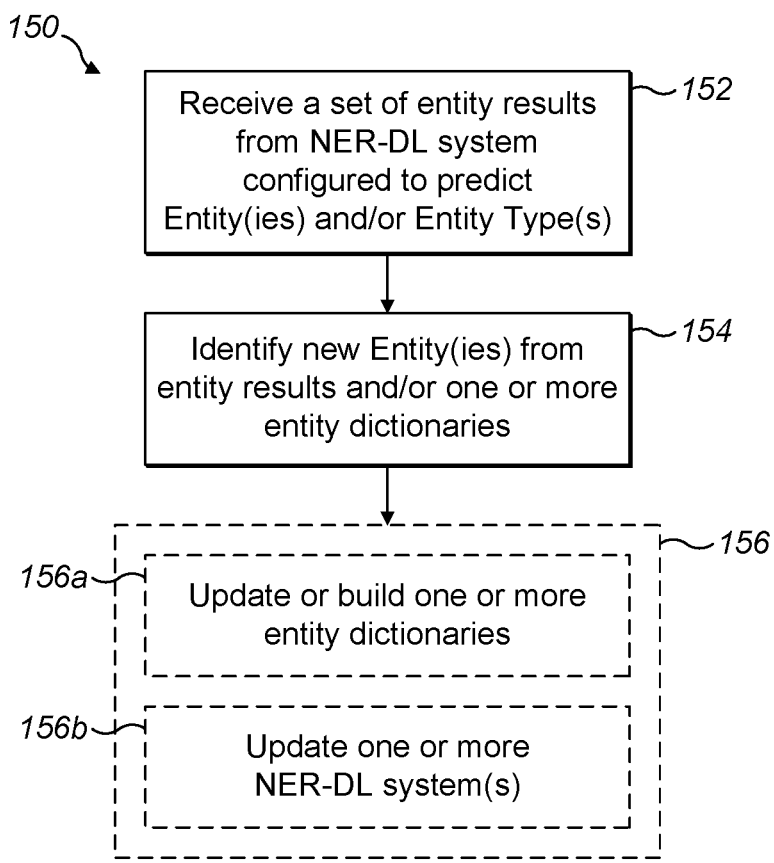
FIG. 1d is a flow diagram illustrating an example process for performing NER according to the invention.

FIG. 1d is a flow diagram illustrating an example process 150 for performing NER for identifying entities in a corpus of text 102 according to the invention. The process 150 may include the following steps of: In step 152, a set of entity results from an NER-DL system is received, the set of entity results may be based on the NER-DL system processing a corpus of text, documents and/or literature. The NER-DL system may include an NER-ML model configured for predicting, identifying and/or classifying entities and/or entity types when processing the corpus of text. In step 154, the set of entity results are processed to identify entities and/or entity types by comparing the entity results output from the NER-DL system with entities stored in one or more entity dictionaries associated with entity types in which the identified entities are different to the entities of the one or more entity dictionaries. Each entity dictionary may include a plurality of entities associated with a particular entity type. In step 156, the identified entities and associated entity types may be used for updating and/or building entity dictionaries, and/or for updating or training one or more ML model(s) of an NER-DL system.

Step 156 may include one or more steps 156a and/or 156b depending on the functions required in relation to any newly identified entities and/or associated entity types. For example, in step 156a, the identified entities and/or entity types are used for updating one or more entity dictionaries, which may include adding identified entities of a particular identified entity type into the corresponding entity dictionary associated with that particular entity type. Alternatively or additionally, in step 156a, the identified entities and/or entity types may be used for building one or more entity dictionaries based on any identified new or additional entity types, which may include generating a new entity dictionary based on a particular identified entity type and adding identified entities associated with this particular identified entity type. For example, in step 156b, the identified entities may be used for updating one or more of the NER model(s) of an NER-DL system by training one or more associated ML techniques for predicting, identifying and/or classifying entities and/or entity types from a corpus of text.

Step 156b may further include generating or updating any entity training datasets used for training ML techniques to generate these ML models used in an NER-DL system. The entity training dataset may include sets of labelled training data in relation to entities and entity types. When newly identified entities and/or entity types are found by the NER-DL system, then additional plurality of sets of labelled data may be generated in relation to the identified entities and/or identified entity types. For example, each set of labelled data may include data representative of a portion of text from the corpus of text including one or more of the identified entities corresponding to that portion of text, and the position of each of the one or more identified entities within the portion of text. In another example, each set of labelled data may include the portion of text including one or more identified entities and the position of each of the one or more identified entities within the portion of text, where the portion of text may be further annotated with one or more entity type labels for each of the one or more identified entities. The updated labelled entity training datasets may be used for training one or more ML technique(s) to update one or more corresponding NER model(s) based on at least the additional plurality of sets of labelled data in relation to the identified entities.

Figure 1E:
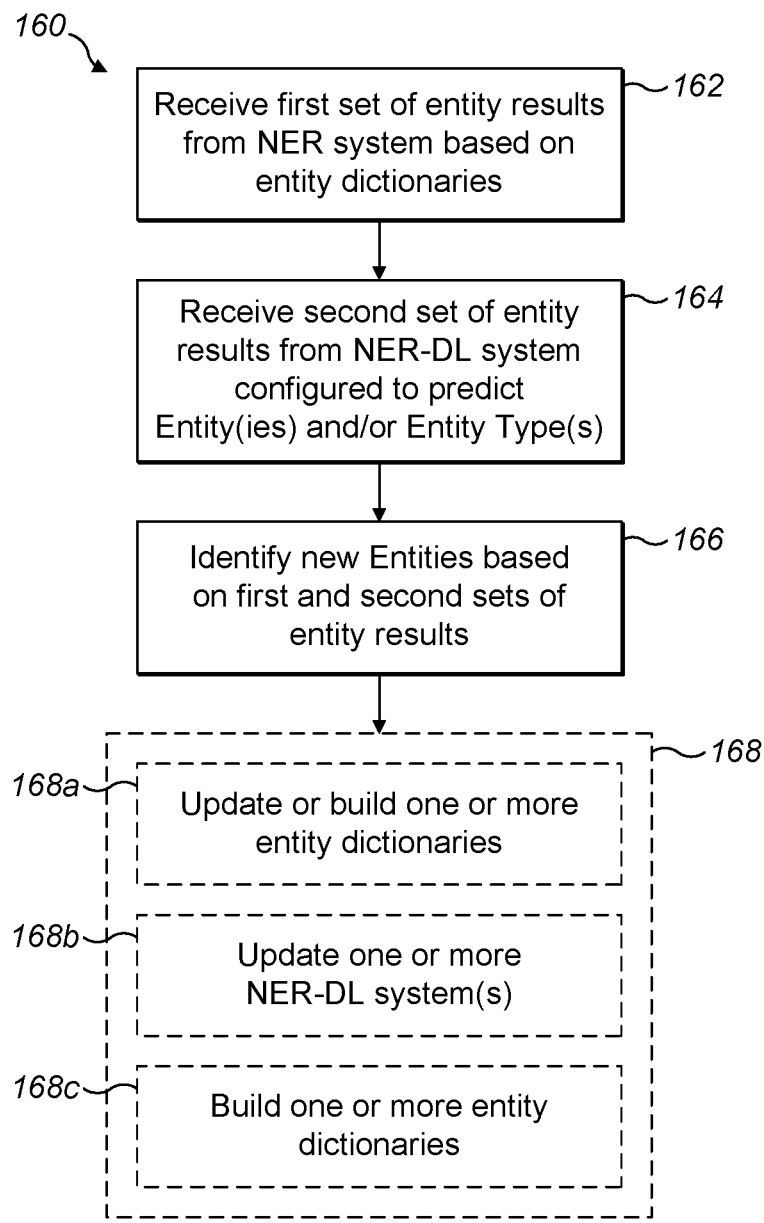
FIG. 1e is a flow diagram illustrating another example process for performing NER according to the invention.

FIG. 1e is a flow diagram illustrating another example process 160 for identifying entities and/or entity types from a corpus of text using NER according to the invention. The process 160 may include the following steps of: In step 162, receiving a first set of entity results from a first NER system based on a corpus of text, the first NER system including a plurality of entity dictionaries configured for identifying entities and/or entity types from the dictionaries within the corpus of text. In step 164, receiving a second set of entity results from a second NER system based on the corpus of text, the second NER system including an NER model configured for predicting, identifying and/or classifying entities and/or entity types within the corpus of text. In step 166, identifying entities based on comparing the entity results output from the first and second NER systems, where the identified entities are different to the entities identified by the first NER system. For example, the identified entities are those entities and/or entity types identified by the second NER system in the second set of entity results that do not correspond to the entities and/or entity types identified in the first set of entity results of the first NER system. In step 168, using the identified new entities in one or more downstream processes. For example, in step 168a, one or more entity dictionaries may be updated or augmented based on the new identified entities in a similar manner as described in step 156*a* of FIG. 1*d*. Alternatively or additionally, in step 168*b*, one or more ML models of an second NER system, e.g. the second NER-ML system, may be updated based on any or all of the new identified entities and/or entity types. This may involve generating further sets of labelled training data based on the newly identified entities, entity types and/or corresponding portions of text. This may be based in a similar manner as that described in step 156*b* of FIG. 1*d*. Alternatively or additionally, in step 168*c*, building an entity dictionaries for each newly identified entity type and populating the entity dictionary associated with the new identified entity type with corresponding identified entities from the corpus of text. This may also be based in a similar manner as that described in step 156*a* of FIG. 1*d* in relation to building entity dictionaries.

Referring to FIGS. 1*d* and 1*e*, steps 154 and 166 may further include comparing the entity results output from the NER model to include the step of comparing the entity results with entities stored in the one or more entity dictionaries, where an entity of the entity results is identified as an additional entity when that entity is determined to be different to the entities of the one or more entity dictionaries. In step 166, comparing may further include determining whether a second set of entity results of the second NER system or NER-ML system includes any entities that are identified to be unique compared to the entities of a first set of entity results of the first NER system, which is a dictionary-based NER system.

Furthermore, steps 154 and 166 may further filter the identified entities of the set of entity results based on how frequently the identified entities occur in the corpus of text. The set of entity results associated with the newly identified entities may be further filtered based on the frequency each identified entity occurs in the corpus of text. The filtered or selected identified entities may be used in steps 156 and/or 168 of FIGS. 1*d* and 1*e*, respectively. For example, each identified entity may further be associated with an entity counter, where the frequency of each entity in the corpus of text is counted by the corresponding entity counter. For example, each identified entity this may have an aggregated count representing the frequency of that identified entity occurring in a corpus of text. The identified entities in the set of entity results may then be filtered based on selecting only those identified entities having an aggregated count above a predetermined entity frequency threshold. The filtered set of entity results may be output for further processing by steps 156 and 168 of FIGS. 1*d* and 1*e*, respectively.

Steps 154 and 166 of FIGS. 1*d* and 1*e*, respectively, may further include validating each identified entity or the identified entities in the filtered set of entity results. The validating may include automatically, semi-automatically, and/or manually validating whether the identified entities and/or entity types are valid in relation to the corresponding portions of text from the corpus of text in which they occur. This may depend on the context in which the identified entities and/or entity types occur in the portions of text. Automatic or semi-automatic validation may include validating the identified entities based on at least one from the group of: an entity matching model based on training a different ML technique for training the model to determine context of the entity; and/or an ML technique for training a entity/entity type matching model that takes into account the context that the entity and/or entity type occurs in the portions of text and predicts whether that entity and/or entity type are valid or not based on this context. The entity/entity type matching model may be based on neural network structure that takes into account the context of the entity and/or entity type within the corresponding portions of text. For example, the neural network may be based on an bi-LSTM structure that takes into account the left context and right context of a portion of text containing the entity and/or entity type.

Figure 2:
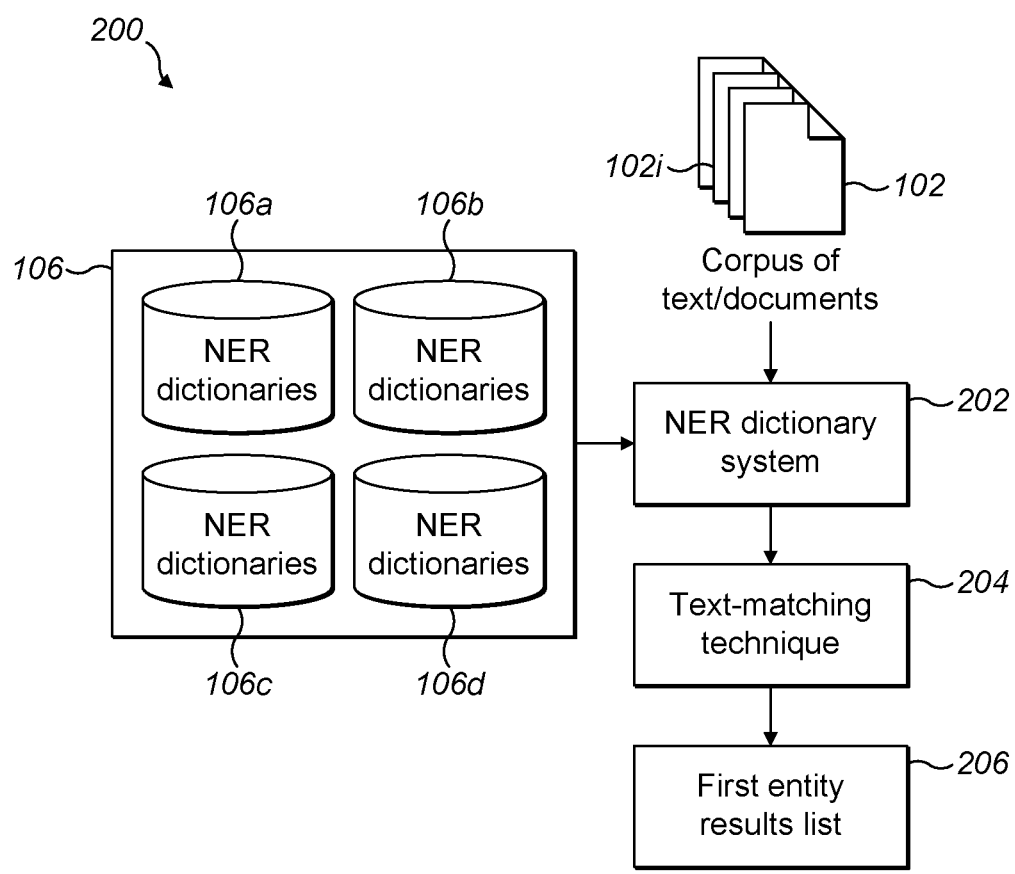
FIG. 2 is a schematic diagram illustrating an example NER system based on entity dictionaries.

FIG. 2 is a schematic diagram illustrating an example NER system 200 based on entity dictionaries, which may be implemented as the first NER system 122 of the NER-DL system 120 or 140 described with reference to FIG. 1*b* or 1*c*. The NER system 200 includes a NER dictionary-based system 202 that uses entity dictionaries 106 for matching entities and/or entity types within a corpus of text 102. The entity dictionaries 106 are used to identify entities and their corresponding entity type within a corpus of text/documents 102 when input into the NER dictionary-based system 202, where text matching techniques 204 may be applied to the corpus of text 102 based on the entity dictionaries. The text matching techniques 204 may be conventional text matching techniques used for identifying possible entities and entity types, where a first set of entity results 206 is generated (e.g. a list of entities, corresponding entity types, and positions within the text of the corpus of text).

The processing of the corpus of text 102 may be achieved using the text matching techniques 204 to identify any entities from each entity dictionary 106*a*-106*d* that may match phrases, portions of characters, and/or character strings in portions of text or text documents and the like from the corpus of text/documents 102. Those character strings that match an entity within an entity dictionary are stored in a set of entity results as identified entities. The each identified entity within the set of entity results may include data representative of the identified entity, the position within the text or text document the identified entity occurs, and, optionally, a document identifier of the document/text from the corpus of text/documents 102 that the entity occurs within.

The set of entity results may include multiple entities of the same type but which occur in different positions within a portion of text or document, and/or occur in different portions of text and/or documents of the corpus of text/documents 102. The set of entity results may be represented by any suitable data structure such as, by way of example only but not limited to, data representative of a list of entities and/or a table of entities, where each row represents an identified entity, entity type and position of the identified entity, or a plurality of records representing each identified entity and the like.

The entity dictionaries 106 may include a plurality of entity dictionaries 106*a*-106*d*. Each of the entity dictionaries 106*a*-106*d* are typically of a different entity type (e.g. a drug entity dictionary 106*a*, a chemical entity dictionary 106*b*, a gene entity dictionary 106*c*, a disease/condition entity dictionary 106*d*, etc.) and are populated with entities associated with that entity type. Entity types of interest from the bioinformatics and/or chem(o)informatics fields may include, by way of example only but it not limited to, drugs, proteins, genes, chemical, tissues cells, diseases/conditions or any other entity type associated with bioinformatics and/or chem(o)informatics. For simplicity, the examples provided herein are based on the bioinformatics and/or chem(o)informatics fields, although entity types of interest from the bioinformatics and/or chem(o)informatics fields are described, this is for simplicity only and by way of example only, it is to be appreciated by the skilled person that the present invention is not limited to only entity types from the bioinformatics and/or chem(o)informatics fields and/or applications therein, but that the present invention is applicable to any entity type from any other field and any other suitable application or as the application demands.

Each of the entity dictionaries 106a-106d are usually manually annotated with entities of a particular entity type. It is apparent that entity dictionaries 106 can become outdated very quickly because of ongoing research generating text such as articles, reports, documents, test results, etc. in each of the fields associated with each entity type. Thus, the corpus of text 102 may always be updated or regularly updated with the latest research that is generated. This also means the entity dictionaries have to be regularly updated to ensure the NER dictionary-based systems 202 have a chance at identifying entities and/or entity types. However, such systems are heavily reliant on up-to-date entity dictionaries, which is typically not possible to achieve. Thus, inaccuracies in the entity results is inevitable with such NER dictionary-based systems.

The NER dictionary-based system 202 processes the corpus of text/documents 102 to generate the first set of entity results list 206. The set of entity results may be collated and provided as data representative of a list or table of identified entities, identified entity types, and/or position(s) where the identified entities/entity types occur within text/documents of the corpus of text/documents. For example, each piece of text or document may be thought of as a string or an array of characters, in which the position of an entity may be based on the first and last character indices of that portion of text identified to represent that entity.

For example, a phrase or sentence of text starting at character index 100 of text document 102i form the corpus of text 102 may read "Paracetamol is used to treat a headache". This sentence has two entities, "Paracetamol" of the drug entity type and "headache" of the disease/condition entity type, respectively. Thus, the NER dictionary-based system 202 may use a drug entity dictionary 106a along with the text matching techniques 204 to identify that this sentence of text includes the entity "Paracetamol" of the drug entity type, which has a position defined by starting character index 100 and ending character index 110 of the text document. The NER dictionary-based system 202 may also use a disease/condition entity dictionary 106d along with the text matching techniques 204 to identify that this sentence of text also includes the entity "headache" of the disease/condition entity type, which has a position defined by starting character index 131 and ending character index 138 of the text document.

Figure 3A:
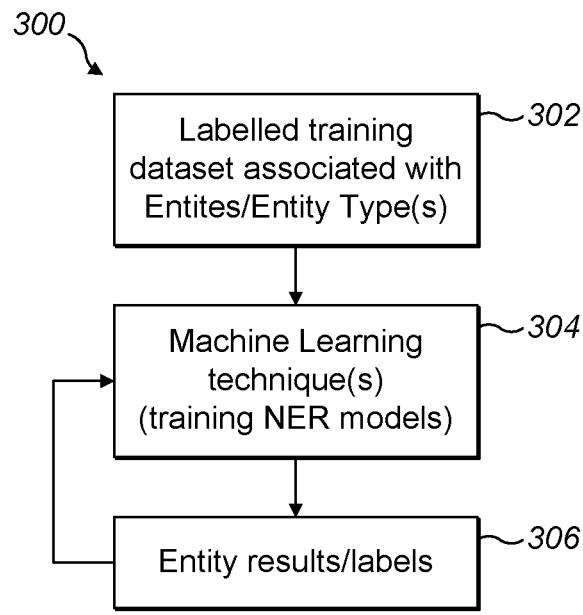
FIG. 3a is a schematic diagram illustrating an example NER Machine Learning (NER-ML) system based on training machine learning technique(s) for use in an NER-DL system according to the invention.

As described previously, the set of entity results may include data representative of the identified entity and corresponding identified entity type, position within the text of the identified entity, and/or, optionally, a text document identifier or link and the like for identifying which portion of text, document from the corpus of text/documents the identified entity occurs. For example, the entity result may be based on a data structure with a format based on: {<entity>, <entity type>, <position—starting character index>:<position—ending character index>, <text document ID>}, where the above sentence would result in the following rows of the entity result list 206 that includes data representative of:

FIG. 3a is a schematic diagram illustrating an example training NER-ML system 300 for training machine learning (ML) technique(s) to generate trained NER-ML models for use in an NER system according to the invention. The training NER-ML system 300 includes a training dataset module 302, ML technique module 304, and update module 306. The training dataset module 302 is configured to provide the ML technique module 304 with labelled training datasets associated with entities and/or entity types. The ML technique module 304 is configured to use the labelled training datasets to train one or more ML technique(s) for generating one or more NER-ML Models for predicting, identifying and/or classifying entities and/or entity types from a corpus of text/documents. The update module 306 is configured to receive the entity results/labels associated with the training datasets and determine whether the NER-ML model(s) have been sufficiently trained, or require further training iterations based on the labelled training datasets. If further training is required, then the ML technique module 304 is configured to continue training the NER-ML Model(s) based on the labelled training datasets from the training dataset module 302. If further training is not required, then the NER-ML Model(s) may be considered to be trained in relation to predicting, identifying and/or classifying entities and/or entity types from a corpus of text/documents and the like.

The ML technique(s) may be trained by using a labelled training dataset associated with entities and/or entity types and the like, which can be generated manually, semi-automatically, or automatically. The labelled training dataset may include a plurality of training data instances or a labelled set of training data instances. Each labelled training data instance may include data representative of a portion of text including one or more entities and an indication of the position of each of the one or more entities within the portion of text. The each of the one or more entities of said each labelled training data instance may also be annotated with entity type labels indicating the entity type of each of those one or more entities.

For example, each training data instance may include data representative of a particular portion of text containing an entity (e.g. a sentence containing an entity of interest) and an indication of the position of that entity within the particular portion of text. As an option, the training data instance may be further annotated with an entity type label based on the type of entity of interest contained in the particular portion of text. The ML technique module 304 may be configured to use a labelled training dataset for training one or more ML technique(s) to generate a ML model based on the labelled training dataset. The labelled training dataset X may include a plurality of labelled training data instances $\{x_1, \ldots x_i, \ldots, x_T\}$ for $1 \leq i \leq T$, where T is the number of labelled training data instances in the labelled training dataset X. Each labelled training data instance $x_i$ may include data representative of the portion of text containing the entity and be labelled with at least one of: 1) an indication of the position of the entity within the portion of text; and 2) an entity type label variable $\ell_l$ for $1 \leq l \leq L$ from a set of binary

| <entity> | <entity type> | <start char index>:<end char index> | <document ID> |
|---|---|---|---|
| Paracetamol | Drug | 100:110 | 102i |
| Headache | Disease/condition | 131:138 | 102i |
| ... | ... | ... | ... | or non-binary labels $\mathcal{L} = \{\ell_1, \ldots, \ell_l, \ldots, \ell_L\}$ each representing an entity type, where L≥1 is the number of entity types that are to be modelled.

Training dataset module 302 or other suitable module may be configured to generate or update the labelled training dataset(s) that may be used by the ML technique module 304 for training ML technique(s) in generating an NER-ML model. A labelled training dataset may be initially generated or updated using a set of entity results output from an NER dictionary-based system as described with reference to FIGS. 1b and/or 2. Each identified entity from the set of entity results may be used to generate each labelled training data instance of the set of labelled training data. For example, for each identified entity in the set of entity results, a labelled training data instance may be created based on a selected portion of text surrounding the identified entity. For example, the selected portion of text may include a set of N characters or words before and after the character string representing the identified entity, where N>=1 (e.g. N=20). The labelled training data instance may also include an indication of the position of the identified entity within the selected portion of text, and, optionally, an entity type label of the entity, if known. This may be performed for all identified entities from a set of entity results. Subsequently, an NER-DL system 100, 120 and/or 140 according to the invention and as described with reference to FIGS. 1a-1e may also generate a set of entity results that identify further entities and/or entity types for validation, which may be validated. In a similar manner, these sets of entity results output from the NER-DL systems 100, 120 and/or 140 may be used for updating or generating further labelled training datasets or data instances. Further labelled training data instances may be created for each of the further identified entities for validated entities from the set of entity results. These may be used to generate new labelled training datasets or added/appended to current labelled training datasets. These may also be used to verify and/or update any existing labelled training data instances to ensure the accuracy of the labelled training dataset(s) may be maintained.

Although the labelled training datasets may include identified entities having different entity types, e.g. a labelled training dataset with mixed entity types, these may be used to generate multi-class NER-ML models for predicting, identifying, and/or classifying entities of different entity types from a corpus of text. However, the labelled training data instances may be sorted by entity type to generate multiple sets of labelled training data instances, one set of labelled training data instances for a particular entity type, where each set of labelled training data instances includes only those labelled training data instances with an entity of a particular entity type. Thus, each set of labelled training data instances for a particular entity type may be used to generate single-class NER-ML models for predicting, identifying and/or classifying entities of a particular entity type from a corpus of text.

Thus, when one or more labelled training dataset(s) have been updated and/or generated, they may be used by the ML technique module 304 for updating or generating one or more corresponding NER-ML model(s). These may output entity results/labels which may be compared with the labelled training dataset(s) to determine whether the NER-ML model(s) have been sufficiently trained or not. This iterative process may be performed until it is determined the NER-ML Model(s) of the ML technique module 304 have been validly trained and are suitable for processing a corpus of text in relation to predicting, identifying and/or classifying entities and/or entity types from the corpus of text.

Figure 3B:
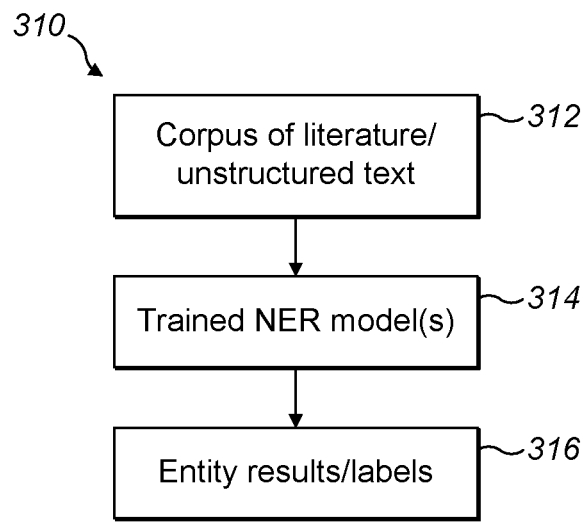
FIG. 3b is a schematic diagram illustrating an example trained NER-ML system of FIG. 3a for use in an NER-DL system according to the invention.

FIG. 3b is a schematic diagram illustrating an example NER-ML system 310 for using trained NER-ML model(s) of FIG. 3a for use in an NER system according to the invention. An corpus module 312 may store and/or retain a corpus of text/documents that may be processed by an NER system for predicting, identifying and/or classifying entities and entity types from the corpus of text. The corpus module 312 may input the corpus of text, or even a subset of the corpus of text for processing to a NER-ML processing module 314, which may include the one or more trained NER-ML models of FIG. 3a. These NER-ML model(s) may each output data representative of a set of entity results and/or labels and the like, which may be collated from each of the NER-ML models and validated by entity result module 316. The entity result module 316 may thus output a set of entity results for the NER-ML system 310. This set of entity results may be used in the NER systems 100, 120 and/or 140 of FIGS. 1a-1e for identifying further entity results that are unknown to one or more entity dictionaries and the like. They may also be used for updating the labelled training dataset(s) as described with reference to FIG. 3a, which can be used for updating the corresponding NER-ML model(s) and the like.

The corpus module 312 may also retrieve text/documents from multiple sources (e.g. literature, article, journal, patent databases and the like) for updating the corpus of text/documents with additional text/documents. These additional text/documents may be generated continuously and/or regularly as scientific and industrial research and development advances in various fields associated with the entities and/or entity types that are being identified. For example, research in the bioinformatics and/or chem(o)informatics fields may regularly create and/or generate a large amount of text/documents incorporating entities associated with bioinformatics and/or chem(o)informatics entity types such as, by way of example only but is not limited to, drugs, genes, proteins, disease/conditions, treatments, cell-lines, any other medical entity type, and the like.

Figure 3C:
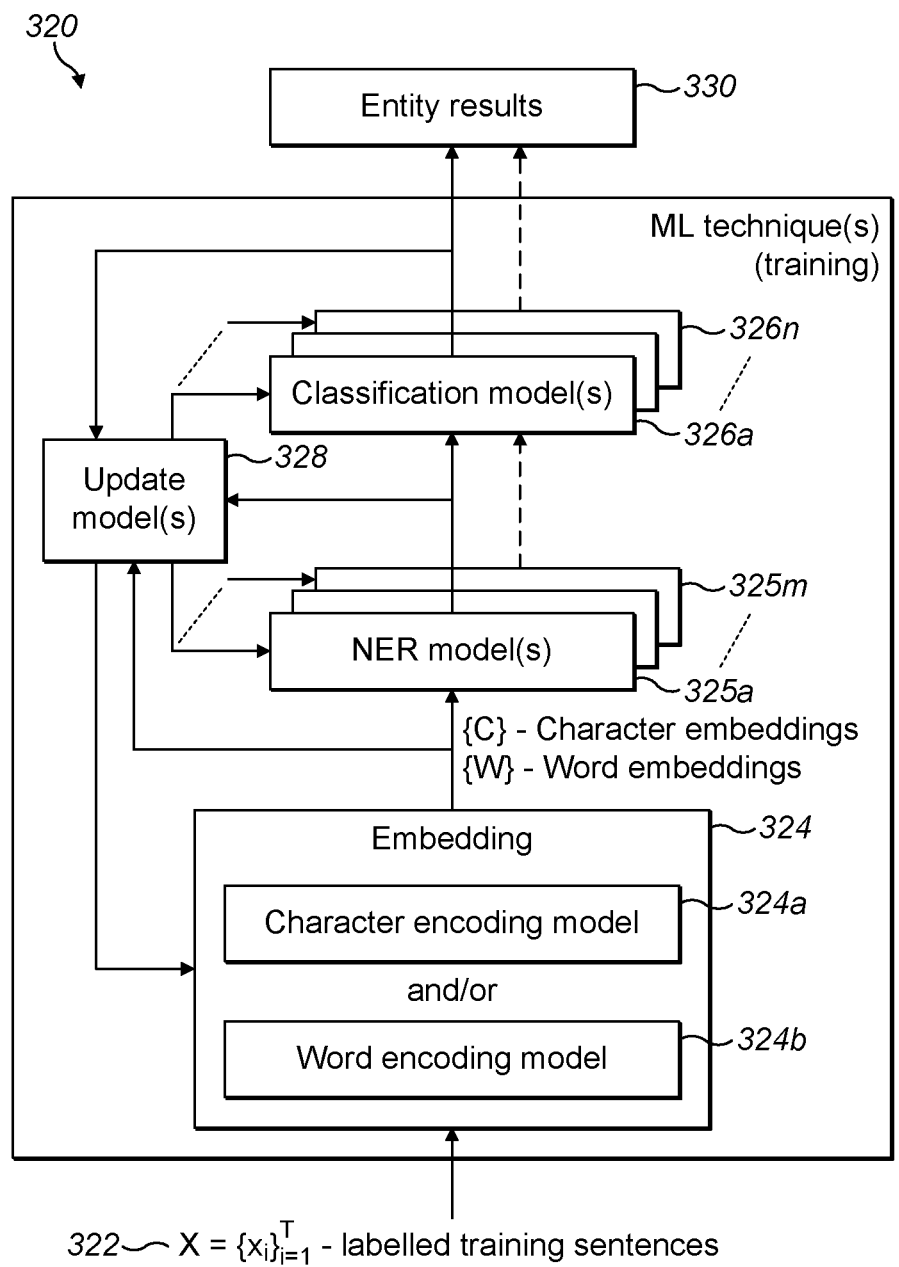
FIG. 3c is a schematic diagram illustrating another example NER-ML system for use in an NER-DL system according to the invention.

FIG. 3c is a schematic diagram illustrating another example NER-ML system 320 for use with an NER-DL system according to the invention. The NER-ML system 320 may include one or more ML technique(s) that may be trained for generating NER-ML model(s) 324, 325 and 326, so-called component models 324, 325, and 326 such as, by way of example only but is not limited to, one or more embedding/encoding models 324a to 324b, one or more NER models 325a-325n, one or more classification model(s) 326a to 326n, and/or one or more combinations and/or modifications thereof. Each of the NER models 324, 325, 326 can be defined by a set of model parameters, which are generated by training the corresponding one or more ML techniques with appropriate labelled training datasets. The model parameters for the NER models 324, 325, and 326 may be jointly trained based on labelled training dataset(s) associated with entities and/or entity types as described with reference to FIGS. 1a to 3b. For example, the labelled training datasets X may include a plurality of labelled training data instances $\{x_1, \ldots x_i, \ldots, x_T\}$ for $1 \leq i \leq T$, where T is the number of labelled training data instances in the labelled training dataset X. Each set of labelled training data or training data instance $x_i$ may include data representative of a portion of text including a character string representing an entity of interest, with an indication of the position of the character string representing the entity of interest within said portion of text, and where each training data instance may be further annotated with an entity type label associated with the entity of interest.

The NER-ML model(s) 324, 325, and 326 may include one or more embedding/encoding models 324 for embedding/encoding input data (e.g. labelled training dataset(s)/data instance(s) during training/updating, portions of text from a corpus of text for processing and the like), into a suitable vector form or syntax for subsequent processing by the NER model(s) 325a-325n and the like. For example, the model parameters of the embedding/encoding model(s) 324 are configured to generate word and/or character embeddings (e.g. $\{w(x_i)\}$, $\{c(x_i)\}$) associated with the text portions of each labelled training data instance $x_i$ during training, and/or text portions input from the corpus of text/documents when the NER system 320 has been sufficiently trained and can process text portions input from the corpus of text/documents for predicting, identifying and/or classifying entities and/or entity types from the corpus of text/documents. The word and/or character embeddings may be in a format, e.g. vector format or latent vector space, that can be more readily processed by the NER model(s) 325. For NER, the embedding/encoding models 324 may include, by way of example only but is not limited to, one or more character encoding model(s) 324a and/or one or more word encoding model(s) 324b. The embedding/encoding models 324 may be based on one or more ML techniques from the group of: neural networks, recurrent neural networks (RNNs), autoencoder(s), CNN, FFNN, LSTM, Word2Vec, Global Vectors for word representation (GloVe), bag of words and/or skip-gram techniques; deep contextualised word representation techniques such as, by way of example only but no limited to, deep Bidirectional Encoder Representations from Transformers (BERT), BERT for Biomedical text (BioBERT), and/or ELMO and the like; co-occurrence based matrix factorisation techniques such as, by way of example only but not limited to, Latent Stochastic Allocation, Latent Dirichlet Allocation, singular value decomposition (SVD) factorisation of co-occurrence matrix and the like; and/or any other suitable one or more ML technique(s) for embedding input data for downstream NER/classification model(s), and/or combinations thereof and/or modifications thereof and the like.

One or more of the outputs of the component models 324, 325 and 326 may be fed to an update module 328, which may be used with the training datasets for training the corresponding ML technique(s) and updating the component models 324, 325 and 326 accordingly. For example, if the component model(s) 324, 325 and 326 are jointly trained, they may be jointly updated based on the set of entity results that may be output from the classification model 326. The update module 328 can be configured to compare the output set of entity results with the corresponding training data instances of the labelled training dataset and, using one or more update algorithms (e.g. stochastic gradient descent or back-propagation algorithms and the like) jointly estimate suitable updates to the model parameters for each of the component models 324, 325 and 326. One or more sets of entity results 330 may be output from the NER-ML model 320.

Figure 3D:
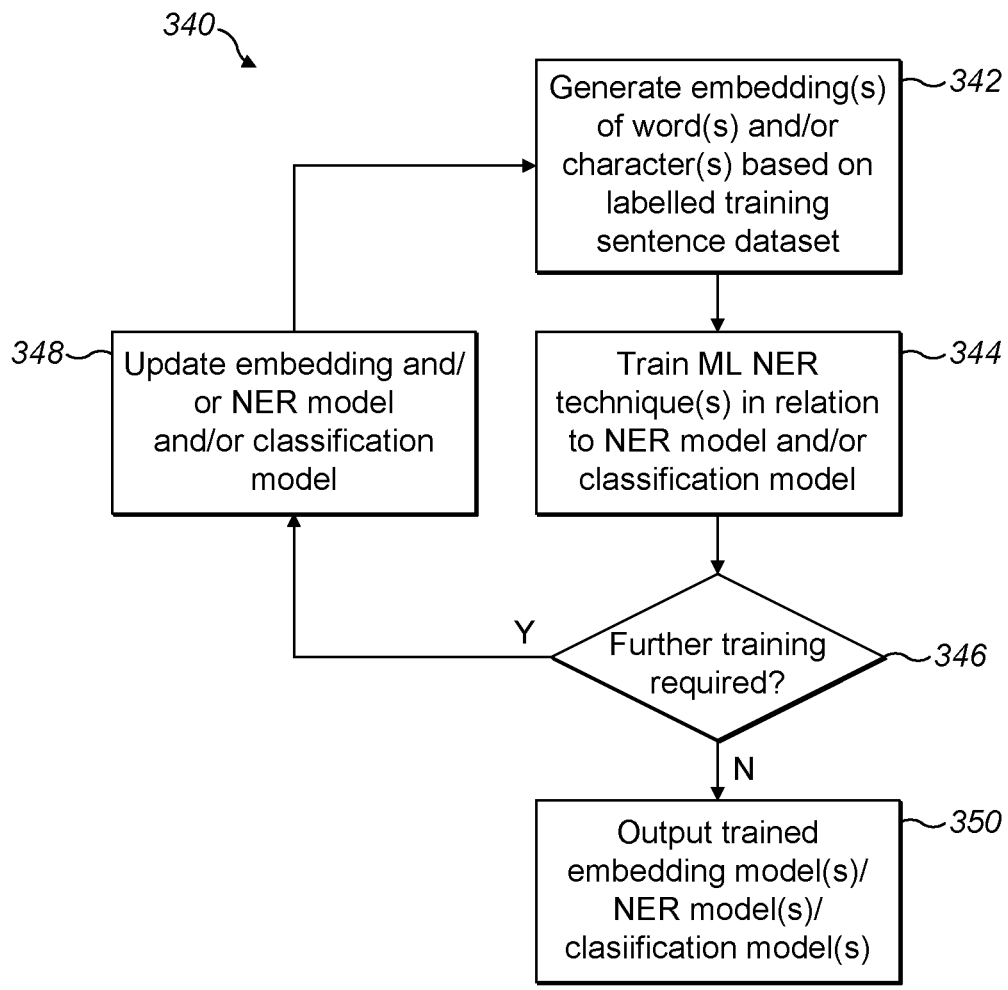
FIG. 3d is a flow diagram illustrating a process for training an NER-ML system of any of FIGS. 3a to 3c for use in an NER-DL system according to the invention.

FIG. 3d is a flow diagram illustrating a process 340 for training an NER-DL system 310 and/or 320 of any of FIGS. 3a to 3c according to the invention. Referring to FIGS. 3c and 3d, in step 342, during training, embeddings of words and/or characters based on labelled training datasets (e.g. labelled training datasets associated with text portions and/or sentences and the like) are generated. For example, each of the labelled training data instances $x_i$ of the labelled training dataset X may be input to the embedding/encoding model(s) 324 (e.g. character embedding/encoding model 324a, word embedding/encoding model 324b), which are configured to generate word and/or character embeddings (e.g. $\{w(x_i)\}$, $\{c(x_i)\}$) associated with the text portions of each labelled training data instance $x_i$. The word and/or character embeddings are in a format, e.g. vector format or latent vector space, that can be more readily processed by the NER model(s) 325.

In step 344, the ML technique(s) associated with each of the NER model(s) 325 and the one or more classification models 326a-326n may be trained. For example, the ML technique(s) associated with each of the NER model(s) 325 are trained on the word and/or character embeddings (e.g. $\{w(x_i)\}$, $\{c(x_i)\}$) associated with the text portions of each labelled training data instance $x_i$ in an iterative manner in which model parameters for each NER model(s) 325a-325n may be generated/created. The NER model(s) 325a-325n may output data, for each labelled training data instance $x_i$, suitable for one or more classification models 326 to estimate entity result data based on said labelled training data instance $x_i$. For example, entity result data output from the classification model(s) 326 in relation to a particular training data instance $x_i$ input to the NER system 320 may include data representative of an identified entity of interest within the text portion of the particular training data instance $x_i$, the position of the entity of interest within this text portion, and/or the entity type associated with the entity of interest within this text portion.

In step 346, it is determined, e.g. by the update module 328, whether further training of the NER-ML models 324, 325, and/or 326 is required, for example, each of the NER-ML models 324, 325, and/or 326 have reached an error threshold that is considered sufficient for the NER-ML models 324, 325 and 326 to be validly trained. For example, once all the training data of the labelled training dataset X has been passed through, the update module 328 determines whether the component models 324, 325, and 326 have been sufficiently trained such that the entity result data output from the NER system 320 is sufficiently accurate to predict, identify and/or represent the entities and/or entity types associated with the labelled training dataset(s). If not, then the process 340 proceeds to step 348, in which the update module 328 may update the ML techniques accordingly; otherwise, the process 340 proceeds to step 350.

In step 348, the update module 328 may receive output entity result data from the classification model(s) 326 for use in jointly optimising the model parameters of the component models 324, 325, and 326. Interim output data from other component model(s) 324 and 325 might also be input to the update module 328 for use in optimising the model parameters. For example, the model parameters may be jointly optimised by comparing the output entity result data with the corresponding labelled training data instances using, by way of example only but is not limited to, an error and/or distance metric, which may be used by one or more update algorithms (e.g. backwards/forwards type propagation algorithms) associated with the corresponding ML technique(s) for updating the model parameters for the component models 324, 325, and 326. The process 340 then proceeds back to step 342, in which the next training iteration begins, where the labelled training dataset is input to the embedding/encoding models 324 and the like.

In step 350, the NER-ML models 324, 325 and 326 are considered trained and the corresponding model parameters defining each model may be output for use in processing text portion(s) from a corpus of text/documents and the like.

Although component models 324, 325 and 326 may be described separately where one or more ML techniques may be used to generate the model parameters for each component model 324, 325 and/or 326 separately, this is by way of example only and the invention is not so limited, it is to be appreciated by the skilled person that one or more ML technique(s) may be used to generate an NER-ML model that may jointly include components 324, 325 and/or 326 as a complete model rather than one or more ML technique(s) separately outputting each component model 324, 325 and/or 326 as a separate models and the like.

Figure 3E:
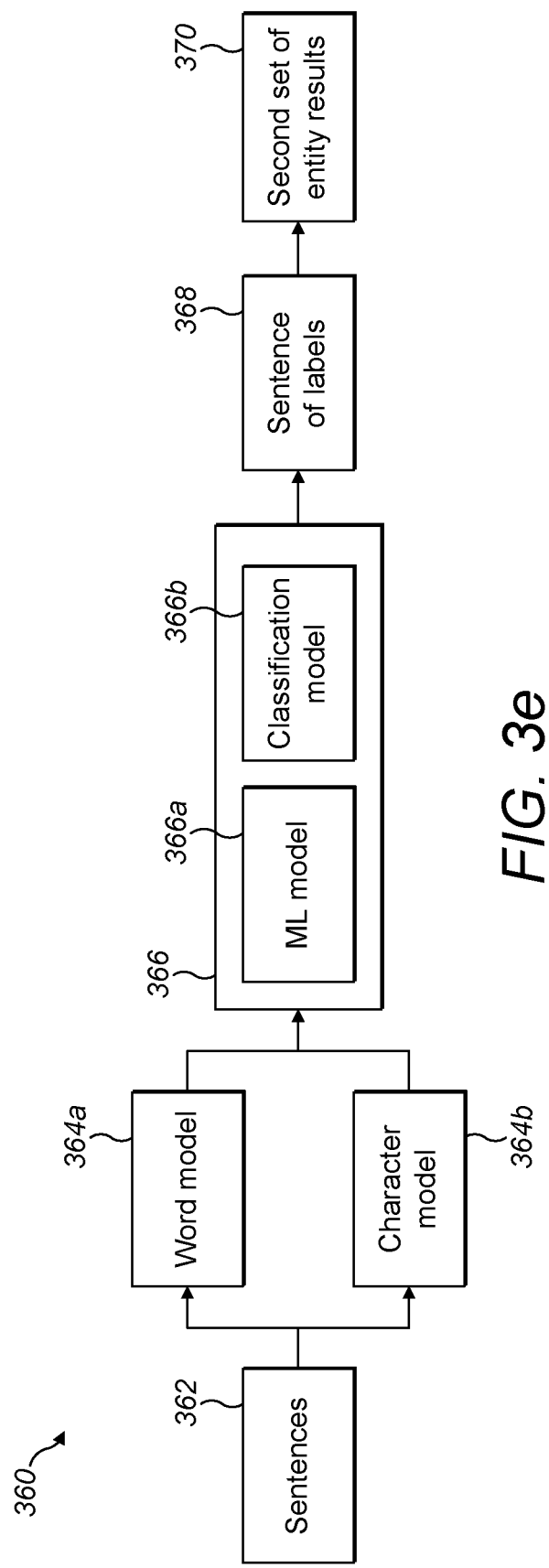
FIG. 3e is a schematic diagram illustrating another example of an NER-ML system for use in an NER-DL system according to the invention.

FIG. 3e is a schematic diagram illustrating another example of an architecture/structure of an NER-ML system 360 for use with the one or more NER-DL systems 100, 120 and 140 according to the invention as described with reference to FIGS. 1a-1e. The NER-ML system 360 is configured to be fed data representative of portions of text such as, by way of example only but not limited to, phrases and/or sentences from a corpus of text/documents in order to find the entities within each portion of text. The NER-ML system 360 includes a sentence module 362 coupled to entity word and/or character models 364a and 364b, respectively. The output of the word and/or character models 364a and 364b is coupled to an NER-ML model 366, which includes one or more NER models 366a and one or more classification models 366b. The NER-ML model 366 may output entity result data which may comprise data representative of a sequence of labels 368 in relation to entities and/or entity types and the like, which may be collated by an entity result module 370 into a set of entity results for output from the NER-ML system 360.

The sentence module 362 is configured for receiving data representative of portions of text (e.g. one or more sentences, paragraphs and/or portions thereof), which may be based on training datasets during training of the model parameters of the models 364 and 366 of NER-ML system 360. After training, the sentence module 362 is configured for receiving data representative of portions of text (e.g. one or more sentences, paragraphs and/or portions thereof) based on one or more text portions (e.g. phrases, sentences, and/or paragraphs and/or portions thereof) from a corpus of text/documents for processing.

The data representative of text portions are input to entity word model 364a, which is configured for capturing word embeddings/encodings of known entities within each portion of text that is input. The data representative of the text portions are input to entity character model 364b configured for capturing character embeddings/encodings of unknown entities within each portion of text that is input. During training of the entity word model 364a and entity character model 364b, one or more ML technique(s) based on embedding and/or encoding methods for learning features of words and characters are applied to text portions of the labelled training datasets. These are configured to learn features of individual characters and sequences that make up a word, part-of-speech or other syntactic features in each portion of text (e.g. each sentence). The entity word model 364a is trained and configured to capture known entities from portion(s) of text, whilst the entity character model 364b is trained and configured to capture entities from portion(s) of text that are much rarer or have not been captured previously.

The one or more ML model(s) 366a are configured for predicting and/or identifying whether an entity(ies) and/or entity type(s) is present based on each portion of text. In this example, the entity word and character embeddings/encodings may be jointly fed/input to the NER-ML model 366, in which the one or more ML model(s) 366a are configured for predicting and/or identifying whether an entity(ies) and/or entity type(s) is present based an input captured word and/or character embedding/encoding of each portion of text. During training, one or more ML technique(s) may also be applied to generate the model parameters of models 364a-366a, which may be based on neural network structures. For example, ML technique(s) based on neural network structures, such as, by way of example only but not limited to, Bi-LSTM neural networks, may be applied to the word and/or character embeddings/encodings of a portion of text to generate the model parameters for the ML model 366a. In this case, the ML model 366a is based on a neural network structure and includes suitable model parameters for said neural network structure. The neural network structure may tokenize the embedding/encoding of a portion of text to obtain a representation for each token in the text portion. For example, for an ML technique based on Bi-LSTM neural network structure, the ML technique may be trained based on one or more labelled training dataset(s) as described herein such that the resulting ML model 366a (e.g. a Bi-LSTM neural network model) includes hidden neural layers with hidden states for each token, which are retained after training. For a given token, the Bi-LSTM structure includes forward and backward hidden states, which may be concatenated together to give an entity representation.

The ML model 366a is configured to process the representation for each word and/or character string embedding/encoding in each portion of text, where the words and/or characters are assigned labels or tags from a set of labels/tags (e.g. set of entity or entity type labels/tags). The set of labels/tags may include one or more labels/tags such as, by way of example but is not limited to: "other" or "O" label/tag (not an entity); a "beginning of an entity" or "B" label/tag (the starting point of an entity especially when an entity may comprise multiple words or character strings); "in an entity" or "I" label/tag (word or character string is within an entity); "single entity" or "S" label/tag (e.g. a single word or character string is an entity); and/or "end of an entity" or "E" label/tag (e.g. the ending point of an entity especially when an entity may comprise multiple words or character strings).

Although the set of labels/tags has been described having several labels/tags, this is by way of example only and the invention is not so limited, it is to be appreciated by the skilled person that a set of labels/tags may have any number of labels/tags that may be defined and/or assigned in relation to describing, predicting and/or identifying the entities and/or entity types, and/or positions of the identified entities and/or entity types that may occur within a portion of text and/or as the application demands. The word specific hidden states of the ML model, e.g. when based on a Bi-LSTM structure, can be used to predict and/or identify these labels/tags. The ML model 366a may output entity data representative of, by way of example only but is not limited to: data representative of the predicted entity(ies) and/or entity type(s), the predicted/identified labels/tags within each portion of text associated with the predicted entity(ies) and/or entity type(s); an indication of where the predicted identified labels/tags occur within each portion of text; and also an indication or data representative of a probability distribution of the entity(ies), entity type(s), and/or assigned labels/tags in relation to each portion of text. The ML model 366a entity data is fed to the classification model 366b for further identifying and classifying and the like.

The classification model 366b is configured to receive the ML model 366a output entity data representing the predictions/identifications of entities/entity types, where the classification model 366b is configured for classifying the possible predicted/identified entities and/or entity types in each portion of text to determine a most likely sequence of entity labels and, optionally, corresponding entity type labels based on the predicted/identified entity(ies) of the portion of text. One or more ML techniques may be trained to generate the model parameters for the classification model 366b, the one or more ML techniques may be based on, by way of example only but is not limited to, neural architectures including neural network structures, tagging structures, stack LSTMs, conditional random field (CRF) type structures and/or tagging models, and/or any other ML technique and the like for classifying entities and/or entity types in accordance with the invention. The model parameters of the classification model 366b (e.g. a CRF model) are trained such that the classification model 366b is configured to process the output entity data of the ML model 366a based on the probability distributions of the entity data to determine the best matching sequence for the labels/tags for the whole portion of text (e.g. whole phrase and/or sentence(s) and the like). Thus, instead of processing each individual label/tag output from the ML model 366a in relation to a text portion, the classification model 366b may be configured to simultaneously process the labels/tags output from the ML model 366a in relation to the whole portion of text and determine the best estimate of a sequence of labels/tags that best represents the portion of text.

The classification model 366b is configured to produce a sequence of entity labels for each portion of text (e.g. a phrase and/or one or more sentences and the like), which are used by sequence label module 368 to deduce whether there is an entity within the portion of text, what type of entity is within the portion of text and/or the position of the entity within the portion of text and the like. The entity result module 370 may be configured to collate the sequence of entity labels or output of the sequence label module 368 into a set of entity results, which may include data representative of one or more identified entities, the position of the one or more identified entities within each portion of text, a label representing the entity type(s) of each of the one or more identified entities, and/or, optionally, an indication of where the portion of text/document came from within the corpus of text/documents (e.g. a unique identifier of the text/document that the portion of text came from).

In some embodiments, the model parameters for the entity word model 364a, entity character model 364b, machine learning model 366a and classification model 366b are jointly trained based on a labelled dataset as described with reference to FIGS. 1a to 3d. For example, the labelled training dataset may include a plurality of sets of labelled data and/or training data instances, where each training data instance (or set of labelled data) includes data representative of a portion of text including one or more entities, each entity may be annotated with one or more entity type labels, and one or more indications of the position of each of the one or more entities within the portion of text. Once trained, the model parameters of the models 364a-366b are used to form a trained NER-ML system 360, which is further configured for outputting a set of entity results based on an input corpus of text, the second set of entity results comprising a list of a plurality of matched entities, the entity type of each matched entity, and a position within the text that the matched entities occur.

Figure 4A:
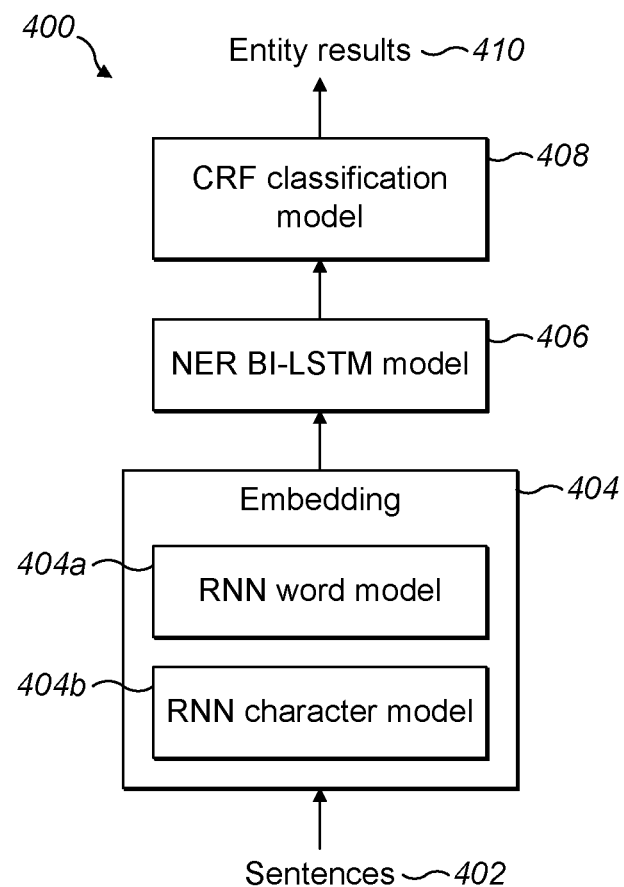
FIG. 4a is a schematic diagram illustrating an example NER-ML system for use with the NER-DL system according to the invention.
Figure 4B:
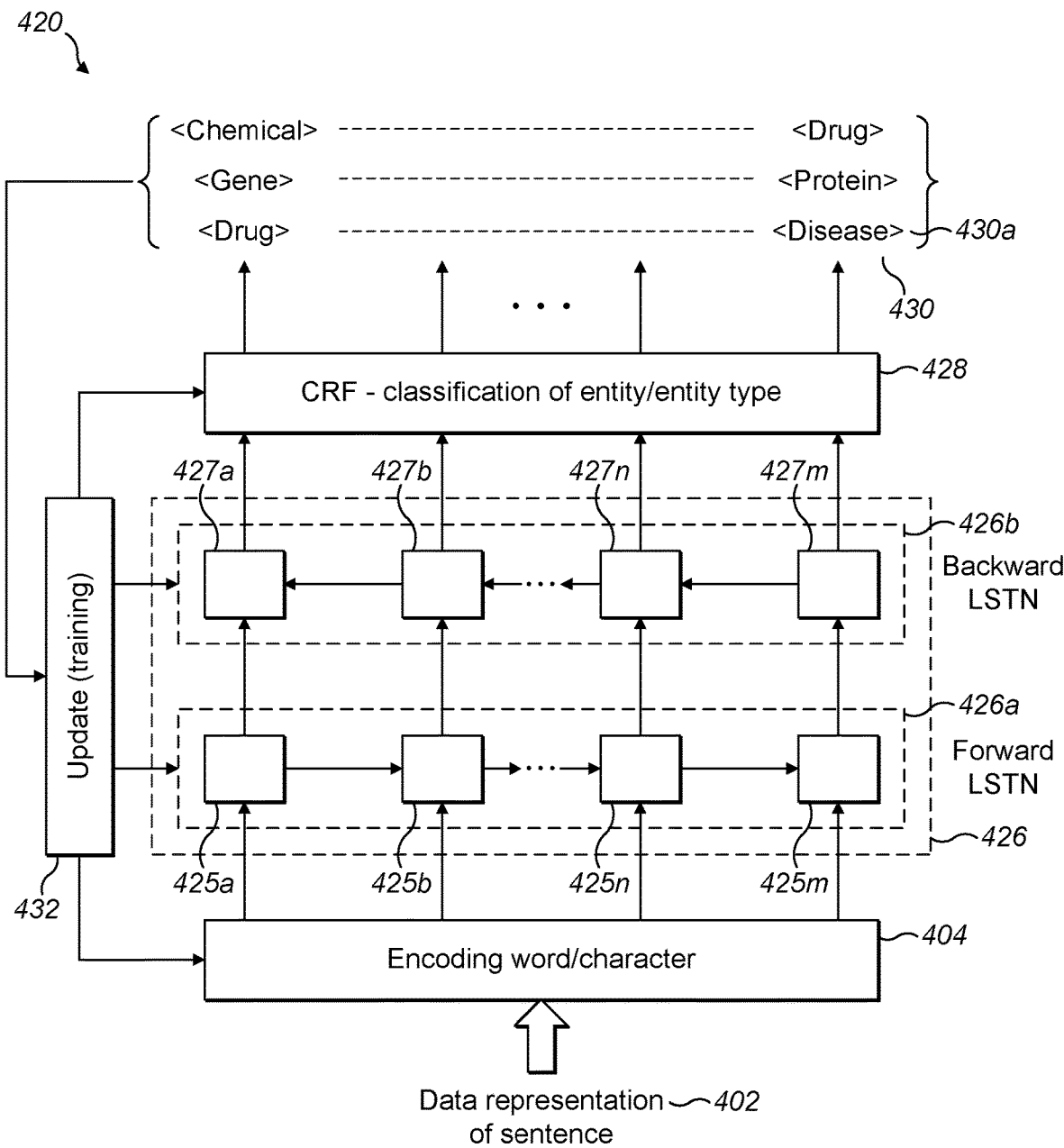
FIG. 4b is a schematic diagram illustrating the example NER-ML system of FIG. 4a for use with the NER-DL system according to the invention.

FIG. 4a is a schematic diagram illustrating another example NER-ML system 400 for use with the NER-DL systems 100, 120 and/or 140 described with reference to any of FIGS. 1a-1e according to the invention. FIG. 4b is a schematic diagram illustrating the neural network structure 420 of the NER-ML system 400 of FIG. 4a for use with the NER-DL systems 100, 120 and/or 140 described with reference to any of FIGS. 1a-1e according to the invention. Referring to FIG. 4a, the NER-ML system 400 is based on an LSTM-CRF neural network structure, in which the NER-ML system 400 includes an embedding/encoding model 404 including a entity word embedding model 404a and a entity character embedding model 404b that are trained to generate corresponding embedded/encoded portions of text suitable for input to an NER bidirectional-LSTM (BI-LSTM) neural network model 406. The NER BI-LSTM model 406 is trained to process the embedded/encoded portion of text and output a prediction and/or identify entities and/or entity type labels or tags in relation to the embedded portion of text. A CRF classification model 408 is coupled to the NER-BI-LSTM model 406, which may include one or more hidden layers (or neural layers) for processing the predicted and/or identified entities and/or entity type labels or tags in relation to the embedded portion of text to generate the most likely sequence of entity labels in relation to the portion of text.

The entity word embedding model 404a and a entity character embedding model 404b are fed or receive data representative of one or more portions of text (e.g. sentence(s) 402 either from a labelled training dataset during training, or from a corpus of text/documents and the like when the model parameters of the NER-ML system 400 have been trained and are suitable for predicting, identifying and/or classifying entities and/or entity types from the corpus of text/documents. The entity word model 404a and/or the entity character model 404b may be based on one or more ML techniques or neural network structures such as, by way of example only but is not limited to, RNN, FFNN, CNN, LSTM, LSTM-CRF, autoencoder structure, Word2Vec, look-up table or vocabulary structures, Global Vectors for word representation (GloVe), bag of words and/or skip-gram techniques; deep contextualised word representation techniques such as, by way of example only but no limited to, BERT, BioBERT, and/or ELMO and the like, and/or any other suitable neural network structure, other ML or vocabulary structures, combinations thereof and/or modifications thereof and the like for generating an embedding/encoding of a portion of text suitable for input to the NER BI-LSTM model 406.

In this example, the entity word model 404a may include a look-up table structure in relation to a vocabulary of words (e.g. entities and the like), where the word representations in the look-up table have been generated by the entity word model 404a. The look-up table structure may include data representative of a single Nw-dimensional word vector per word representation in the vocabulary of words, where Nw is the number of vector elements in the word vector. In this example, the entity character model 404b may be based on an RNN structure. The RNN structure may represent characters based on data representative of Nc-dimensional character vector per character, where Nc is the number of vector elements in the character vector. Although the entity word model 404a is described as including or using a look-up table structure or vocabulary structure, it is to be appreciated by the skilled person in the art that the entity word model 404a may be based on other types of structures or techniques such as, by way of example only but not limited to, BERT or ELMo, which may produce models that encode each input sentence and produce context specific embeddings in which look-up table structures are not sufficient or appropriate.

In this example, the values corresponding to each word or character for the entity word and character models 404*a* and 404*b* may be generated, updated and trained during training of the NER-ML system 400. For the character model 404*b* a word representation is generated with by running the trained RNN over character embedding vectors, which are also learned during training. The entity word and character embeddings/encodings for a portion of text may be represented as word vectors in an Nw-dimensional vector space for each word or character string and character vectors in an Nc-dimensional vector space for each character, which may form the embedded/encoded portion of text. An entity word vector and character vector may be of the same size, or can they be different, where Nw<Nc, Nw=Nc or Nc<Nw. The entity word vectors and/or character word vectors may be of any dimension and do not need to have any relation to each other. The dimension of the entity word vectors and/or character word vectors may be determined based on parameter tuning and/or heuristics/experience based on the amount of training data and the like.

Unknown words for the entity word model 404*a* may be represented by a common word vector, which is a particular or unique word vector that has been set or defined to represent unknown words. This common word vector is a representation that is used for everything that is not known by the system vocabulary after training. Similarly, the entity character model 404*b* may also generate an embedding for these words. However, unknown characters may be represented by a common character vector, which is a particular or unique character vector that has been set or defined to represent unknown characters that are not found in the trained set (or pre-defined) of characters after training.

The embedding/encoding model 404 is coupled to the NER BI-LSTM model 406, which is trained to jointly receive data representative of the word and character embeddings/encodings (e.g. embedded portion of text) from the embedding model 404 and output a prediction and/or identify entity and/or entity type labels or tags in relation to the embedded portion of text as described with reference to FIG. 3*e*. The CRF classification model 408 is trained to receive the predicted and/or identified entities and/or entity type labels or tags in relation to the embedded portion of text from the NER-BI-LSTM model 406, and output a sequence of entity labels. The model parameters for the entity word model 404*a*, entity character model 404*b*, NER-BI-LSTM model 406 and CRF classification model 406 are jointly trained based on a plurality of sets of labelled data and/or training data instances as described with reference to FIGS. 1*a*-3*e*.

A set of entity results may be determined from the sequence of entity labels and the like to include data representative of: one or more identified entities, if any, in relation to one or more entity types of interest (e.g. drug, disease/condition, protein, chemical, treatment and the like); an indication of the position of the identified entities; and/or, optionally annotated with entity type labels and the like; and/or, if entities are being identified from a corpus of text/documents and the like, optionally annotated with an identifier for identifying the section of text and/or document the portion of text may be from in the corpus of text/documents, which may be useful when validating the identified entities/entity types using automated, semi-automated and/or manual validation techniques and the like. For example, the trained NER-ML system 400 may be configured for outputting a set of entity results based on an input corpus of text, where the set of entity results include data representative of a list of a plurality of matched or identified entities, the entity type of each matched/identified entity, and a position within the text or portions of text that the matched/identified entities occur.

FIG. 4*b* is a schematic diagram illustrating the neural network structure 420 of the NER-ML system 400 of FIG. 4*a*. Referring to FIGS. 4*a* and 4*b*, the encoding/embedding model 404 is fed data representative of a portion of text 402 (e.g. "Paracetamol is good for toothache"), in which each word and/or character string of the portion of text 402 (e.g. "Paracetamol", "is", "good", "for", "toothache") are processed by the entity word model 404*a* to form a first set of data representative of known word embedding/encodings and processed by the entity character model 404*b* to form a second set of data representative of unknown word embeddings/encodings. The BI-LSTM neural network structure 426 may include forward and backward hidden states 426*a* and 426*b* configured for representing the portion of text, where the forward and backward hidden states 426*a* and 426*b* are concatenated together for generating an entity representation of the portion of text.

For example, the entity character model 404*b* may be based on an RNN, whereas the entity word model 404*a* is based on a lookup table structure/technique (e.g. entity words being represented by a single vector per word). The vector values corresponding to each word are trained during training of the NER-ML system 400. Regarding the entity character model 404*b*, a word representation is generated with by running the RNN over character embedding vectors, which are also learned during training of the NER-ML system 400. For unknown entity words, the entity word embedding has a common vector for everything that is not known in the lookup table of the system vocabulary. The entity character model can also generate embedding for unknown entity words as well, where it has a common unknown character vector for any character not found in the pre-defined set of characters.

For example, the model parameters of the BI-LSTM neural network model 406 of FIG. 4*a* form a BI-LSTM neural network structure 426 may include a forward LSTM neural network structure 426*a* that reads in the word and character embeddings from embedding model 404 in a left to right context of the portion of text, and a backward LSTM neural network structure 436*b* that reads in the word and character embeddings in a right to left context of the portion of text. The forward LSTM 426*a* includes the forward hidden states in the form of neural network layer 426*a* that may include a plurality of neural network cells 425*a*-425*m*, that receive and process the word embeddings and/or character embeddings in a left context. Similarly, the backward LSTM 426*b* includes the backward hidden states in the form of neural network layer 426*b* that may include another plurality of neural network cells 427*a*-427*m*, that receive and process the word embeddings and/or character embeddings in a right context.

As described with reference to FIG. 3*c*, the BI-LSTM model 406 and BI-LSTM structure 426 are configured to process the representation for each word and/or character string embedding/encoding in each portion of text and assign labels or tags from a set of labels/tags (e.g. entity or entity type labels/tags). The set of labels/tags may include one or more labels/tags such as, by way of example but is not limited to: "other" or "0" label/tag (not an entity); a "beginning of an entity" or "B" label/tag (the starting point of an entity especially when an entity may comprise multiple words or character strings); "in an entity" or "I" label/tag (word or character string is within an entity); "single entity" or "S" label/tag (e.g. a single word or character string is an entity); and/or "end of an entity" or "E" label/tag (e.g. the ending point of an entity especially when an entity may comprise multiple words or character strings).

Although the set of labels/tags has been described having several labels/tags, this is by way of example only and the invention is not so limited, it is to be appreciated by the skilled person that a set of labels/tags may have any number of labels/tags that may be defined and/or assigned in relation to describing, predicting and/or identifying the entities and/or entity types, and/or positions of the identified entities and/or entity types that may occur within a portion of text and/or as the application demands. The Bi-LSTM structure 426 is trained and configured to predict and/or identify these labels/tags for each of the word and/or character embeddings of the portion of text. For example, for the input sentence/portion of text "Paracetamol is good for toothache", the BI-LSTM network 426 may be configured to identify entities of the disease and/or drug entity types and so may be trained to output a prediction of the embeddings as labels/tags of {"S", "O", "O", "O", "S"} for each of the words or character strings of the portion of text "Paracetamol", "is", "good", "for", "toothache". The BI-LSTM model and/or structure 426 may also be configured to output entity data representative of, by way of example only but is not limited to: data representative of predicted entity(ies) and/or entity type(s), the predicted/identified labels/tags within each portion of text as described above; an indication of where the predicted identified labels/tags occur within each portion of text; and also an indication or data representative of a probability distribution of the predicted entity(ies), entity type(s), and/or assigned labels/tags in relation to each portion of text. The BI-LSTM network 426 may feed the output entity data (e.g. predicted entity(ies), entity type(s), entity/type labels/tags predictions and the like) to a conditional random field classification model 428 for use in determining entity/entity type and the like.

The CRF classification model 408 or 428 is configured to receive the output entity/entity type predictions of the BI-LSTM neural network 426 and classify the possible predicted/identified entities and/or entity types in each portion of text to determine a most likely sequence of entity labels and, optionally, corresponding entity type labels based on the predicted/identified entity(ies) of the portion of text. The model parameters of the CRF classification model 408/428 are trained such that the classification model 366b is configured to process each individual label/tag output from the ML model 366a in a simultaneous fashion in relation to the whole portion of text and thus determine the best estimate of a sequence of labels/tags (e.g. entity labels/tags and/or entity type labels/tags) that best represents the portion of text. For example, there may be several sequences of entity labels/entity type labels 430 that are generated; and in the case of the portion of text "Paracetamol is good for toothache", the sequence of entity labels/types {<DRUG>, "S"; . . . ; <DISEASE>, "S"} may be the sequence that best represents "Paracetamol is good for toothache". The output sequence may be collated into a set of entity results, which may include data representative of: a list of one or more identified entities; the position of the one or more identified entities within each portion of text; a label representing the entity type(s) of each of the one or more identified entities; and/or, optionally, an indication of where the portion of text/document came from within the corpus of text/documents (e.g. a unique identifier of the text/document that the portion of text came from).

Figure 5A:
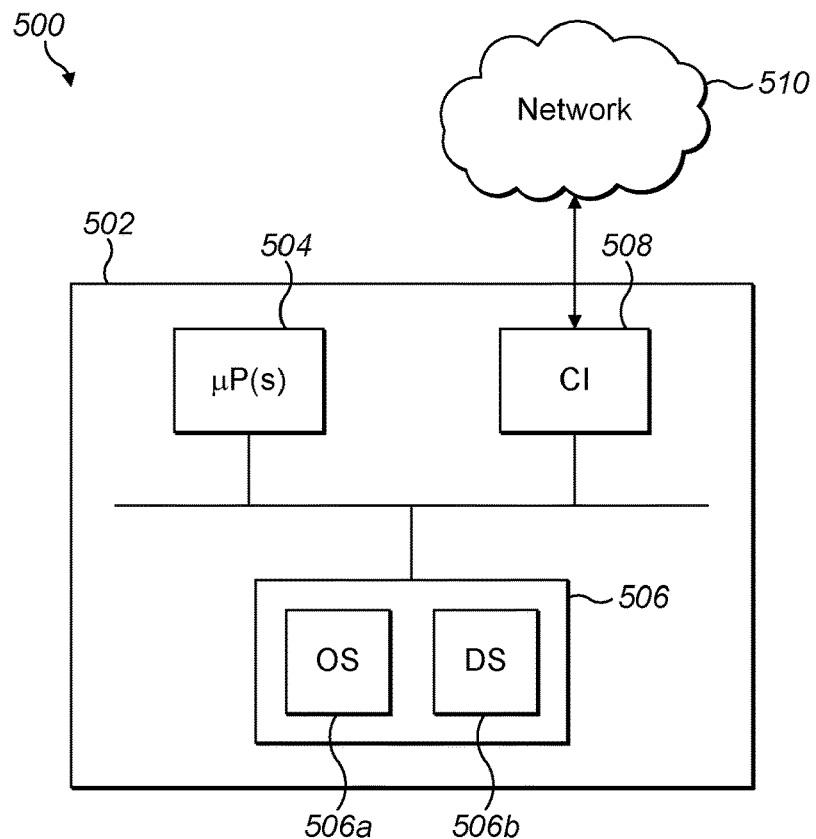
FIG. 5a is a schematic diagram illustrating a computing system/device according to the invention.

FIG. 5a is a schematic diagram illustrating an example computing system 500 with a computing device 502 that may be used to implement one or more aspects of an NER-DL system 100, 120, 140 and/or NER-ML system for processing a corpus of text according to the invention and/or includes the process(es), method(s), system(s), and/or apparatus as described with reference to FIGS. 1a-4b. Computing device 502 includes one or more processor unit(s) 504, memory unit 506 and communication interface 508 in which the one or more processor unit(s) 504 are connected to the memory unit 506 and the communication interface 508. The communications interface 508 may connect the computing device 502, via a communication network 510, with one or more databases or other processing system(s) or computing device(s) for implementing the invention as described herein. The memory unit 506 may store one or more program instructions, code or components such as, by way of example only but not limited to, an operating system 506a for operating computing device 502 and a data store 506b for storing additional data and/or further program instructions, code and/or components associated with implementing the functionality and/or one or more function(s) or functionality associated with one or more of the method(s) and/or process(es) of the apparatus, mechanisms and/or system(s)/platforms/architectures as described herein and/or as described with reference to at least one of figure(s) 1a to 4b.

Further aspects of the invention may include one or more apparatus and/or devices that include a communications interface, a memory unit, and a processor unit, the processor unit connected to the communications interface and the memory unit, wherein the processor unit, storage unit, communications interface are configured to perform or implement the system(s), apparatus, method(s) and/or process(es) or combinations thereof as described herein with reference to FIGS. 1a to 4b.

Figure 5B:
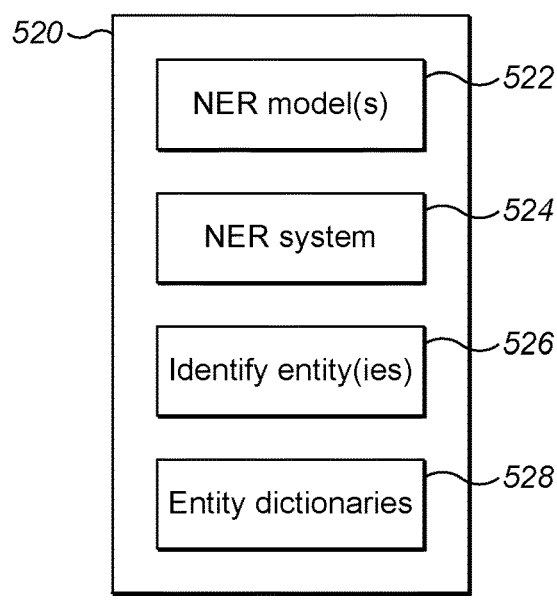
FIG. 5b is a schematic diagram illustrating a system according to the invention.

FIG. 5b is a schematic diagram illustrating a system 520 for performing NER on a corpus of text/documents according to the invention. The system 520 includes one or more NER ML Models 522, an NER-DL system or NER ML system 524, an entity identifying module/device 526 and one or more entity dictionaries 528. The NER ML model(s) 522 may include, by way of example only but is not limited to, one or more neural network structures configured to process an input portion of text into a set of entity results identifying one or more entities of interest, entity types of interest, positions of the entities of interest within the portion of text and the like. The NER-DL system 524 may include, by way of example only but is not limited to, a NER dictionary based system and NER system using NER-ML models, which both are used to process a corpus of text and output sets of entity results, which are analysed to identify additional or new entities and/or entity types from the corpus of text/documents. The entity identification module/device 526 may include, by way of example only but is not limited to, an analysis/comparison mechanism for identifying entities from the sets of entity results output from the NER-DL system(s) 524, where the identified entities may be validated in an automated, semi-automated or manual fashion. The entity dictionaries module/device 528 may be configured to generate, build and/or update entity dictionaries based on the identified and/or validated entities and/or entity types. The NER Models 522, NER systems 524, entity identification module/device 526 and/or entity dictionaries 528 may be configured according to the method(s), process(es), attention apparatus and/or system(s) associated with the invention, modifications thereof, and/or as described herein, and/or as described with reference to FIGS. 1a-5a for providing an efficient and improved accuracy of identified entities and/or entity types, and/or new entities and/or entity types for use in training downstream ML processes, models, classifiers and the like.

In other aspects, an NER-DL apparatus according to the invention may include one or more processor(s), a memory and/or a communication interface, the one or more processor(s) is connected to the memory and/or the communication interface, where the one or more processor(s) is configured to implement one or more of the process(es) 150, 160, 340 and/or one or more of the apparatus/systems 100, 120, 140, 200, 300, 310, 320, 360 400, 420, 500 and 520 and/or NER-DL systems, NER-ML model(s), classifier(s), and/or any method(s)/process(es), step(s) of these process(es), modifications thereof, as described with reference to any one or more FIGS. 1a to 5b. Furthermore, the process(es) one or more of the process(es) 150, 160, 340 and/or one or more of the apparatus/systems 100, 120, 140, 200, 300, 310, 320, 360 400, 420, 500 and 520, NER-DL systems, NER-ML model(s), classifier(s), and/or any method(s)/process(es), step(s) of these process(es), modifications thereof, as described with reference to any one or more FIGS. 1a to 5b may be implemented in hardware and/or software.

In the embodiment described above the server may comprise a single server or network of servers. In some examples the functionality of the server may be provided by a network of servers distributed across a geographical area, such as a worldwide distributed network of servers, and a user may be connected to an appropriate one of the network of servers based upon a user location.

The above description discusses embodiments of the invention with reference to a single user for clarity. It will be understood that in practice the system may be shared by a plurality of users, and possibly by a very large number of users simultaneously.

The embodiments described above are fully automatic. In some examples a user or operator of the system may manually instruct some steps of the method to be carried out.

In the described embodiments of the invention the system may be implemented as any form of a computing and/or electronic device. Such a device may comprise one or more processors which may be microprocessors, controllers or any other suitable type of processors for processing computer executable instructions to control the operation of the device in order to gather and record routing information. In some examples, for example where a system on a chip architecture is used, the processors may include one or more fixed function blocks (also referred to as accelerators) which implement a part of the method in hardware (rather than software or firmware). Platform software comprising an operating system or any other suitable platform software may be provided at the computing-based device to enable application software to be executed on the device.

Various functions described herein can be implemented in hardware, software, or any combination thereof. If implemented in software, the functions can be stored on or transmitted over as one or more instructions or code on a computer-readable medium. Computer-readable media may include, for example, computer-readable storage media. Computer-readable storage media may include volatile or non-volatile, removable or non-removable media implemented in any method or technology for storage of information such as computer readable instructions, data structures, program modules or other data. A computer-readable storage media can be any available storage media that may be accessed by a computer. By way of example, and not limitation, such computer-readable storage media may comprise RAM, ROM, EEPROM, flash memory or other memory devices, CD-ROM or other optical disc storage, magnetic disc storage or other magnetic storage devices, or any other medium that can be used to carry or store desired program code in the form of instructions or data structures and that can be accessed by a computer. Disc and disk, as used herein, include compact disc (CD), laser disc, optical disc, digital versatile disc (DVD), floppy disk, and blu-ray disc (BD). Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, DSL, or wireless technologies such as infrared, radio, and microwave are included in the definition of communication medium. Combinations of the above should also be included within the scope of computer-readable media.

Alternatively, or in addition, the functionality described herein can be performed, at least in part, by one or more hardware logic components. For example, and without limitation, hardware logic components that can be used may include Field-programmable Gate Arrays (FPGAs), Program-specific Integrated Circuits (ASICs), Program-specific Standard Products (ASSPs), System-on-a-chip systems (SOCs). Complex Programmable Logic Devices (CPLDs), etc.

Although illustrated as a single system, it is to be understood that the computing device may be a distributed system. Thus, for instance, several devices may be in communication by way of a network connection and may collectively perform tasks described as being performed by the computing device.

Although illustrated as a local device it will be appreciated that the computing device may be located remotely and accessed via a network or other communication link (for example using a communication interface).

The term 'computer' is used herein to refer to any device with processing capability such that it can execute instructions. Those skilled in the art will realise that such processing capabilities are incorporated into many different devices and therefore the term 'computer' includes PCs, servers, mobile telephones, personal digital assistants and many other devices.

Those skilled in the art will realise that storage devices utilised to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realise that by utilising conventional techniques known to those skilled in the art that all, or a portion of the software instructions may be carried out by a dedicated circuit, such as a DSP, programmable logic array, or the like.

It will be understood that the benefits and advantages described above may relate to one embodiment or may relate to several embodiments. The embodiments are not limited to those that solve any or all of the stated problems or those that have any or all of the stated benefits and advantages. Variants should be considered to be included into the scope of the invention.

Any reference to 'an' item refers to one or more of those items. The term 'comprising' is used herein to mean including the method steps or elements identified, but that such steps or elements do not comprise an exclusive list and a method or apparatus may contain additional steps or elements.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something".

Further, to the extent that the term "includes" is used in either the detailed description or the claims, such term is intended to be inclusive in a manner similar to the term "comprising" as "comprising" is interpreted when employed as a transitional word in a claim.

The figures illustrate exemplary methods. While the methods are shown and described as being a series of acts that are performed in a particular sequence, it is to be understood and appreciated that the methods are not limited by the order of the sequence. For example, some acts can occur in a different order than what is described herein. In addition, an act can occur concurrently with another act. Further, in some instances, not all acts may be required to implement a method described herein.

Moreover, the acts described herein may comprise computer-executable instructions that can be implemented by one or more processors and/or stored on a computer-readable medium or media. The computer-executable instructions can include routines, sub-routines, programs, threads of execution, and/or the like. Still further, results of acts of the methods can be stored in a computer-readable medium, displayed on a display device, and/or the like.

The order of the steps of the methods described herein is exemplary, but the steps may be carried out in any suitable order, or simultaneously where appropriate. Additionally, steps may be added or substituted in, or individual steps may be deleted from any of the methods without departing from the scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. What has been described above includes examples of one or more embodiments. It is, of course, not possible to describe every conceivable modification and alteration of the above devices or methods for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims.

The invention claimed is:

1. A system comprising:
   at least one processor; and
   memory, coupled to the at least one processor, and storing executable instructions for the at least one processor, wherein the at least one processor is configured, based on the executable instructions stored in the memory, to implement:
   a first named entity recognition (NER) system comprising one or more entity dictionaries, the first NER system configured to identify entities and/or entity types within a corpus of text based on the one or more entity dictionaries; and
   a second NER system comprising a machine learning (ML) NER model trained to predict entities and/or entity types within the corpus of text,
   wherein the at least one processor is further configured to:
   identify entities based on comparing entity results output from the first and second NER systems, wherein the identified entities are different from the entities identified by the first NER system;
   filter the entity results output from the second NER system to remove all entities other than the identified entities;
   validate whether the filtered entities and/or entity types are valid in relation to the corresponding portions of text from the corpus of text in which they occur; and
   update the one or more entity dictionaries based on the validated filtered entities,
   wherein an entity comprises entity data associated with an entity type selected from the group of: gene, disease, compound/drug, protein, chemical, organ, or biological.

2. The system as claimed in claim 1, the processor is further configured to build a set of entity dictionaries based on at least the validated filtered entities.

3. The system as claimed in claim 1, wherein the processor is further configured to generate or update the ML NER model by training a ML technique based on at least the validated filtered entities for predicting entities and/or entity types from the corpus of text.

4. The system as claimed in claim 3, wherein the ML technique comprises at least one ML technique from the group of:
   a neural network;
   a recurrent neural network;
   a feed-forward neural network;
   a convolutional neural network;
   a long short-term memory, LSTM, neural network;
   a neural network based on LSTM conditional random field, CRF; and
   any other ML technique for predicting entities and entity types from a corpus of text.

5. The system as claimed in claim 3, wherein the processor is configured to train the ML technique to generate or update the ML NER model based on labelled data, the labelled data comprising a plurality of sets of labelled data, in which each set of labelled data comprises a portion of text including one or more entities and the position of each of the one or more entities within the portion of text.

6. The system as claimed in claim 1, wherein the processor is further configured to:
   generate an additional plurality of sets of labelled data in relation to the validated filtered entities, in which each set of labelled data comprises a portion of text from the corpus of text including one or more of the validated filtered entities corresponding to that portion of text and the position of each of the one or more filtered entities within the portion of text; and train an ML technique to update the ML NER model based on at least the additional plurality of sets of labelled data for predicting entities and/or entity types from the corpus of text.

7. The system as claimed in claim 6, wherein each set of labelled data further comprises annotations corresponding to one or more entity type labels for each of the one or more validated filtered entities.

8. The system as claimed in claim 1, wherein the ML NER model further comprises:
a machine learning, ML, model configured for predicting whether an entity and/or entity type is present based on a portion of text; and
a classification model configured for classifying the predicted entity(ies) of the portion of text to determine a most likely sequence of entity labels based on the predicted entity(ies) of the portion of text.

9. The system as claimed in claim 8, wherein the ML NER model further comprises:
an entity word model configured for capturing word embeddings/encodings of known entities within a portion of text;
an entity character model configured for capturing character embeddings/encodings of unknown entities within a portion of text; and
the machine learning, ML, model further configured for predicting whether an entity and/or entity type is present based on input captured word and/or character embedding(s)/encoding(s) of the portion of text.

10. The system as claimed in claim 9, wherein model parameters for the entity word model, entity character model, machine learning model and classification model are jointly trained based on a plurality of sets of labelled data, each set of labelled data comprising a portion of text including one or more entities and annotated with one or more entity type labels for each of the one or more entities and the position of each of the one or more validated filtered entities within the portion of text.

11. The system as claimed in claim 8, wherein the ML model is based on a neural network comprising forward and backward hidden states configured for representing a portion of text, wherein the forward and backward hidden states are concatenated together for generating an entity representation of the portion of text.

12. The system as claimed in claim 11, wherein the neural network is based on a Bi-Long Short Term Memory neural network model and the classification model is based on a conditional random field, CRF, model.

13. The system as claimed in claim 1, wherein the ML NER model is further configured for outputting a second set of entity results based on an input corpus of text, the second set of entity results comprising a list of a plurality of matched entities, the entity type of each matched entity, and a position within the text that the matched entities occur.

14. The system as claimed in claim 1, wherein the processor is further configured to compare the entity results output from the ML NER model with entities stored in the one or more entity dictionaries, wherein an entity of the entity results output from the ML NER model is identified as an additional entity when that entity is determined to be different from the entities of the one or more entity dictionaries.

15. The system as claimed in claim 14, wherein a count for each identified additional entity is aggregated, and each identified additional entity with a count over a predetermined threshold are validated based on the context that these identified additional entities appear in the corpus of text.

16. The system as claimed in claim 1, wherein the processor is further configured to determine whether a second set of entity results of the second NER system includes any entities that are identified to be unique compared to the entities of a first set of entity results of the first NER system.

17. The system as claimed in claim 1, wherein the processor is further configured to validate the filtered entities based on at least one from the group of:
an entity matching model based on training a different ML technique for training the model to determine context of the entity; and
an ML technique for training a entity type matching model based on an LSTM structure that takes into account the left context and right context of a portion of text containing the entity.

18. The system as claimed in claim 1, wherein the processor is further configured to aggregate the entity results output from the first NER system and second NER system, wherein the aggregated results include those entities satisfying at least one of the following rules of:
if an entity is the same in the entity results of both first and second NER systems in relation to the same corresponding portion of text, then the entity is included in the aggregated results and
if an entity is unique and validated in relation to the corresponding portion of text, then the entity is included in the aggregated results.

19. A named entity recognition (NER) system comprising:
at least one processor; and
memory, coupled to the at least one processor, and storing executable instructions for the at least one processor, wherein the at least one processor is configured, based on the executable instructions stored in the memory, to:
implement a machine learning (ML) NER model trained to predict entities and/or entity types within a corpus of text;
identify entities based on comparing entity results output from the ML NER model with entities stored in one or more entity dictionaries, wherein the identified entities are different from the entities of the one or more entity dictionaries;
filter the entity results output from the ML NER model to remove all entities other than the identified entities;
validate whether the filtered entities and/or entity types are valid in relation to the corresponding portions of text from the corpus of text in which they occur; and
update the one or more entity dictionaries based on the validated filtered entities,
wherein an entity comprises entity data associated with an entity type selected from the group of: gene, disease, compound/drug, protein, chemical, organ, or biological.

20. The system as claimed in claim 19, wherein the processor is further configured to execute:
another NER system comprising one or more entity dictionaries, the another NER system configured to identify entities and/or entity types within a corpus of text based on the one or more entity dictionaries comprised in the another NER system; and
wherein the comparison further includes comparing entity results output from the NER system and the another NER system, wherein filtered entities include those entities that are different from the entities identified by the another NER system.

21. A computer-implemented method for identifying entities in a corpus of text, the method comprising:
- receiving a first set of entity results from a first name entity recognition (NER) system based on a corpus of text, the first NER system comprising a plurality of entity dictionaries configured to identify entities and/or entity types from the dictionaries within the corpus of text;
- receiving a second set of entity results from a second NER system based on the corpus of text, the second NER system comprising a machine learning (ML) NER model trained to predict entities and/or entity types within the corpus of text;
- identifying entities based on comparing the entity results output from the first and second NER systems, wherein the identified entities are different from the entities identified by the first NER system;
- filtering the entity results output from the second NER system to remove all entities other than the identified entities;
- validating whether the filtered entities and/or entity types are valid in relation to the corresponding portions of text from the corpus of text in which they occur; and
- updating the one or more entity dictionaries based on the validated filtered entities,
- wherein an entity comprises entity data associated with an entity type selected from the group of: gene, disease, compound/drug, protein, chemical, organ, or biological.

22. The computer-implemented method as claimed in claim 21, further comprising building a set of entity dictionaries based on at least the validated filtered entities.

23. The computer-implemented method as claimed in claim 21, further comprising updating the ML NER model by training a machine learning, ML, technique based on at least the validated filtered entities for predicting entities and/or entity types from the corpus of text.

24. The computer-implemented method as claimed in claim 23, wherein the ML technique comprises at least one ML technique from the group of:
- a neural network;
- a recurrent neural network;
- a feed-forward neural network;
- a convolutional neural network;
- a long short-term memory, LSTM, neural network;
- a neural network based on LSTM conditional random field, CRF; and
- any other ML technique for predicting entities and entity types from a corpus of text.

25. The computer-implemented method as claimed in claim 21, further comprising training an ML technique for generating or updating the ML NER model based on labelled data, the labelled data comprising a plurality of sets of labelled data, in which each set of labelled data comprises a portion of text including one or more entities and the position of each of the one or more entities within the portion of text.

26. The computer-implemented method as claimed in claim 25, wherein each set of labelled data further comprises annotations corresponding to one or more entity type labels for each of the one or more entities.

27. The computer-implemented method as claimed in claim 21, further comprising:
- generating an additional plurality of sets of labelled data in relation to the validated filtered entities, in which each set of labelled data comprises a portion of text from the corpus of text including one or more of the validated filtered entities corresponding to that portion of text and the position of each of the one or more validated filtered entities within the portion of text; and
- training an ML technique to update the ML NER model based on at least the additional plurality of sets of labelled data for predicting entities and/or entity types from the corpus of text.

28. The computer-implemented method as claimed in claim 21, wherein the ML NER model further comprises:
- a machine learning, ML, model configured for predicting whether an entity(ies) and/or entity type(s) is present based on a portion of text; and
- a classification model configured for classifying the predicted entity(ies) of the portion of text to determine a most likely sequence of entity labels based on the predicted entity(ies) of the portion of text.

29. The computer-implemented method as claimed in claim 28, wherein the ML NER model further comprises:
- an entity word model configured for capturing word embeddings/encodings of known entities within a portion of text;
- an entity character model configured for capturing character embeddings/encodings of unknown entities within a portion of text; and
- the machine learning, ML, model further configured for predicting whether an entity and/or entity type is present based on input captured word and/or character embedding(s)/encoding(s) of the portion of text.

30. The computer-implemented method as claimed in claim 29, further comprising jointly training model parameters for the entity word model, entity character model, machine learning model and classification model are based on a plurality of sets of labelled data, each set of labelled data comprising a portion of text including one or more entities and annotated with one or more entity type labels for each of the one or more entities and the position of each of the one or more validated filtered entities within the portion of text.

31. The computer-implemented method as claimed in claim 28, wherein the ML model is based on a neural network comprising forward and backward hidden states configured for representing a portion of text, wherein the forward and backward hidden states are concatenated together for generating an entity representation of the portion of text.

32. The computer-implemented method as claimed in claim 31, wherein the neural network is based on a Bi-Long Short Term Memory neural network model and the classification model is based on a conditional random field, CRF, model.

33. The computer-implemented method as claimed in claim 21, further comprising outputting from the ML NER model a second set of entity results based on an input corpus of text, the second set of entity results comprising a list of a plurality of matched entities, the entity type of each matched entity, and a position within the text that the matched entities occur.

34. The computer-implemented method as claimed in claim 21, wherein comparing the entity results output from the ML NER model further comprises comparing the entity results output from the ML NER model with entities stored in the one or more entity dictionaries, wherein an entity of the entity results output from the ML NER model is identified as an additional entity when that entity is determined to be different from the entities of the one or more entity dictionaries.

35. The computer-implemented method as claimed in claim 34, further comprising aggregating a count for each filtered entity, and validating each filtered entity with a count over a predetermined threshold based on the context that these filtered entities appear in the corpus of text.

36. The computer-implemented method as claimed in claim 21, wherein comparing further comprises determining whether a second set of entity results of the second NER system includes any entities that are identified to be unique compared to the entities of a first set of entity results of the first NER system.

37. The computer-implemented method as claimed in claim 21, wherein validating further comprises validating the filtered entities based on at least one from the group of:
 an entity matching model based on training a different ML technique for training the model to determine context of the entity; and
 an ML technique for training a entity type matching model based on an LSTM structure that takes into account the left context and right context of a portion of text containing the entity.

38. The computer-implemented method as claimed in claim 21, further comprising aggregating the entity results output from the first NER system and second NER system, wherein the aggregated results include those entities satisfying at least one of the following rules of:
 if an entity is the same in the entity results of both first and second NER systems in relation to the same corresponding portion of text, then the entity is included in the aggregated results and
 if an entity is unique and validated in relation to the corresponding portion of text, then the entity is included in the aggregated results.

39. A machine learning, ML, model obtained from the computer-implemented method of claim 21.

40. An apparatus comprising a processor, a memory unit and a communication interface, wherein the processor is connected to the memory unit and the communication interface, and wherein the processor and memory are configured to implement the computer-implemented method of claim 21.

41. A non-transitory computer-readable medium comprising data or instruction code, which when executed on a processor, causes the processor to implement the computer-implemented method according to claim 21.

42. A computer-implemented method for identifying entities in a corpus of text, the method comprising:
 receiving a set of entity results from a named entity recognition (NER) system based on the corpus of text, the NER system comprising a machine learning (ML) NER model trained to predict entities and/or entity types within the corpus of text;
 identifying entities based on comparing the entity results output from the NER system with entities stored in one or more entity dictionaries, wherein the identified entities are different from the entities of the one or more entity dictionaries;
 filtering the entity results output from the NER system to remove all entities other than the identified entities;
 validating whether the filtered entities and/or entity types are valid in relation to the corresponding portions of text from the corpus of text in which they occur; and
 updating the one or more entity dictionaries based on the validated filtered entities,
 wherein an entity comprises entity data associated with an entity type selected from the group of: gene, disease, compound/drug, protein, chemical, organ, or biological.

43. The computer-implemented method as claimed in claim 42, further comprising:
 receiving another set of entity results from another NER system based on a corpus of text, the another NER system comprising a plurality of entity dictionaries configured to identify entities and/or entity types from the dictionaries within the corpus of text; and
 the comparison further including comparing entity results output from the NER system and the another NER system, wherein filtered entities include those entities that are different from the entities identified by the another NER system.

* * * * *